US012750716B2

(12) United States Patent
Kim et al.

(10) Patent No.: US 12,750,716 B2
(45) Date of Patent: Sep. 29, 2026

(54) METHOD AND DEVICE FOR CONTROLLING INTERFERENCE SIGNAL MEASUREMENT IN WIRELESS COMMUNICATION SYSTEM

(71) Applicant: Samsung Electronics Co., Ltd., Suwon-si (KR)

(72) Inventors: Minchul Kim, Suwon-si (KR); Kwonjong Lee, Suwon-si (KR); Juho Lee, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 18/724,430

(22) PCT Filed: May 25, 2022

(86) PCT No.: PCT/KR2022/007439
§ 371 (c)(1),
(2) Date: Jun. 26, 2024

(87) PCT Pub. No.: WO2023/128080
PCT Pub. Date: Jul. 6, 2023

(65) Prior Publication Data

US 2025/0344091 A1 Nov. 6, 2025

(30) Foreign Application Priority Data

Jan. 3, 2022 (KR) ........................ 10-2022-0000337

(51) Int. Cl.
*H04W 24/10* (2009.01)
*H04W 56/00* (2009.01)
*H04W 72/542* (2023.01)

(52) U.S. Cl.
CPC ....... *H04W 24/10* (2013.01); *H04W 56/0045* (2013.01); *H04W 72/542* (2023.01)

(58) Field of Classification Search
None
See application file for complete search history.

(56) References Cited

U.S. PATENT DOCUMENTS

2015/0326463 A1* 11/2015 Solondz .............. H04L 43/0829 370/252
2020/0067614 A1* 2/2020 Wang .................. H04J 11/0056
(Continued)

FOREIGN PATENT DOCUMENTS

KR 10-2021-0004447 A 1/2021
KR 10-2021-0056195 A 5/2021
(Continued)

OTHER PUBLICATIONS

Samsung; Enhancements to Timing, Power Control and CLI for NR; 3GPP TSG RAN WG1 #106b-e; R1-2109511; e-Meeting; Oct. 11-19, 2021.
(Continued)

*Primary Examiner* — Angela Nguyen
(74) *Attorney, Agent, or Firm* — Jefferson IP Law, LLP

(57) ABSTRACT

The present disclosure relates to a 5G or 6G communication system for supporting a higher data transfer rate beyond 4G communication systems such as LTE. A method for operating a first base station to control interference signal measurement of a first user equipment (UE) in a wireless communication system, according to an embodiment of the present disclosure, may comprise the steps of receiving information on a transmission/reception mode of a second base station from the second base station, on the basis of the information on the transmission/reception mode of the second base station, determining timing information to be used when the first UE measures an interference signal caused by
(Continued)

an uplink signal of a second UE communicating with the second base station, and transmitting the timing information to the first UE so that the first UE measures the interference signal.

15 Claims, 17 Drawing Sheets

(56) References Cited

U.S. PATENT DOCUMENTS

| | | | |
|---|---|---|---|
| 2020/0112420 | A1 | 4/2020 | Xu et al. |
| 2020/0169341 | A1 | 5/2020 | Hwang et al. |
| 2020/0228212 | A1 | 7/2020 | Xu et al. |
| 2020/0229009 | A1 | 7/2020 | Xu et al. |
| 2020/0351690 | A1 | 11/2020 | Zhu et al. |
| 2021/0006997 | A1 | 1/2021 | Jin et al. |
| 2021/0258133 | A1 | 8/2021 | Raghavan et al. |
| 2021/0409127 | A1* | 12/2021 | Kim ......................... H04J 11/00 |
| 2022/0060265 | A1 | 2/2022 | Xu et al. |
| 2022/0191724 | A1 | 6/2022 | Hwang et al. |

FOREIGN PATENT DOCUMENTS

| | | |
|---|---|---|
| KR | 10-2021-0113206 A | 9/2021 |
| KR | 10-2021-0121251 A | 10/2021 |

OTHER PUBLICATIONS

International Search Report with Written Opinion and English translation dated Sep. 19, 2022; International Appln. No. PCT/KR2022/007439.

Extended European Search Report dated Mar. 12, 2025; European Appln. No. 22916235.9-1215 / 4451753 PCT/KR2022007439.

* cited by examiner

METHOD AND DEVICE FOR CONTROLLING INTERFERENCE SIGNAL MEASUREMENT IN WIRELESS COMMUNICATION SYSTEM

TECHNICAL FIELD

The disclosure relates to a method for controlling interference signal measurement in a wireless communication system, and more particularly, to a method for measuring, reporting, and controlling cross link interference (CLI).

BACKGROUND ART

In the development of wireless communication through successive generations, technologies have been developed mainly for human services, such as voice, multimedia, and data. It is expected that connected devices on an explosive increase since the commercialization of 5th generation (5G) communication systems will be connected to communication networks. Examples of objects connected to a network may include vehicles, robots, drones, home appliances, displays, smart sensors installed in various infrastructures, construction machinery, and factory equipment. Mobile devices are expected to evolve into various form factors such as augmented reality glasses, virtual reality headsets, and hologram devices. In the 6th-generation (6G) era, efforts are made to develop an improved 6G communication system to provide a variety of services by connecting hundreds of billions of devices and objects. For this reason, the 6G communication system is called a beyond 5G system.

In the 6G communication system, which is expected to be realized around 2030, the maximum transmission rate is tera (i.e. 1,000 gigabit) bps, and the wireless delay time is 100 microseconds (usec). In other words, compared to the 5G communication system, the transmission rate in the 6G communication system is 50 times higher, and the wireless delay time is reduced to one tenth.

To achieve these high data rates and ultra-low latency, implementation of the 6G communication system in a terahertz band (e.g., 95 GHz to 3 THz) is being considered. Due to more serious path loss and atmospheric absorption in the terahertz band compared to the mmWave band introduced in 5G, the importance of technology that may guarantee a signal propagation distance, that is, coverage is expected to increase. As main technologies to ensure coverage, radio frequency (RF) devices, antennas, new waveforms better in terms of coverage than orthogonal frequency division multiplexing (OFDM), beamforming, and multi-antenna transmission techniques such as massive multiple input/output (massive MIMO), full dimensional MIMO (FD-MIMO), array antenna, and large scale antenna should be developed. In addition, new technologies such as metamaterial-based lenses and antennas, high-dimensional spatial multiplexing technology using orbital angular momentum (OAM), and reconfigurable intelligent surface (RIS) are under discussion to improve coverage of terahertz band signals.

Further, to improve frequency efficiency and system networks, full duplex technology in which uplink and downlink simultaneously use the same frequency resources at the same time, network technology that uses satellites and high-altitude platform stations (HAPS) in an integrated manner, network structure innovation technology that supports mobile base stations and enables network operation optimization and automation, dynamic spectrum sharing technology through collision avoidance based on spectrum usage prediction, artificial intelligence (AI)-based communication technology that uses AI from a design stage and internalizes end-to-end AI support functions to realize system optimization, and next-generation distributed computing technology that realizes complex services beyond the limits of terminal computing capabilities, using ultra-high-performance communication and computing resources (mobile edge computing (MEC), cloud, and so on) are under development for the 6G communication system. In addition, attempts are continuing to further strengthen connectivity between devices, further optimize networks, promote softwarization of network entities, and increase the openness of wireless communications through the design of new protocols to be used in the 6G communication system, the implementation of a hardware-based security environment, the development of mechanisms for safe use of data, and the development of technologies for maintaining privacy.

Owing to these research and development of the 6G communication system, it is expected that a new level of hyper-connected experience is possible through the hyper-connectivity of the 6G communication system, which includes not only connections between objects but also connections between people and objects. Specifically, it is expected that the 6G communication system will be able to provide services such as truly immersive extended reality (XR), high-fidelity mobile hologram, and digital replica. Further, the 6G communication system will find its applications in various fields including industry, medicine, automobiles, and home appliances by providing services such as remote surgery, industrial automation, and emergency response with improved security and reliability through the 6G communication system.

In a wireless communication system, cross-link interference (CLI) may occur between terminals served by different base stations, and the need for a method for reducing a CLI measurement error of a terminal is emerging.

DETAILED DESCRIPTION OF THE INVENTION

Technical Problem

The disclosure proposes a signaling method for reducing a measurement error of a terminal in cross link interference (CLI) between terminals served by different base stations.

The disclosure proposes a signaling method for reducing a measurement error in CLI between terminals by considering a transmission and reception mode of a base station.

Technical Solution

A method for operating a first base station (BS) for controlling interference signal measurement of a first user equipment (UE) in a wireless communication system according to an embodiment of the disclosure includes receiving information about a transmission and reception mode of a second BS from the second BS, determining timing information used when the first UE measures an interference signal generated by an uplink signal of a second UE communicating with the second BS, based on the information about the transmission and reception mode of the second BS, and transmitting the timing information to the first UE to enable the first UE to measure the interference signal.

A method for operating a first UE for measuring an interference signal in a wireless communication system according to an embodiment of the disclosure includes receiving timing information for measuring an interference signal generated by an uplink signal of a second UE communicating with a second BS from a first BS, and measuring the interference signal generated by the uplink signal of the second UE, based on the timing information. The timing information is determined based on a transmission and reception mode of the second BS.

A first BS for controlling interference signal measurement of a first UE in a wireless communication system according to an embodiment of the disclosure includes a transceiver and a controller. The controller is configured to receive information about a transmission and reception mode of a second BS from the second BS, determine timing information used when the first UE measures an interference signal generated by an uplink signal of a second UE communicating with the second BS, based on the information about the transmission and reception mode of the second BS, and control to transmit the timing information to the first UE to enable the first UE to measure the interference signal.

A first UE for measuring an interference signal in a wireless communication system according to an embodiment of the disclosure includes a transceiver and a controller. The controller is configured to receive timing information used for measuring an interference signal generated by an uplink signal of a second UE communicating with a second BS from a first BS, and measure the interference signal generated by the uplink signal of the second UE, based on the timing information. The timing information is determined based on a transmission and reception mode of the second BS.

Advantageous Effects

A method and apparatus according to an embodiment of the disclosure may reduce a measurement error of a terminal in cross link interference (CLI) between terminals served by different base stations through signaling.

A method and apparatus according to an embodiment of the disclosure may reduce a measurement error in CLI between terminals by considering a transmission and reception mode of a base station.

MODE FOR CARRYING OUT THE INVENTION

Figure 1:
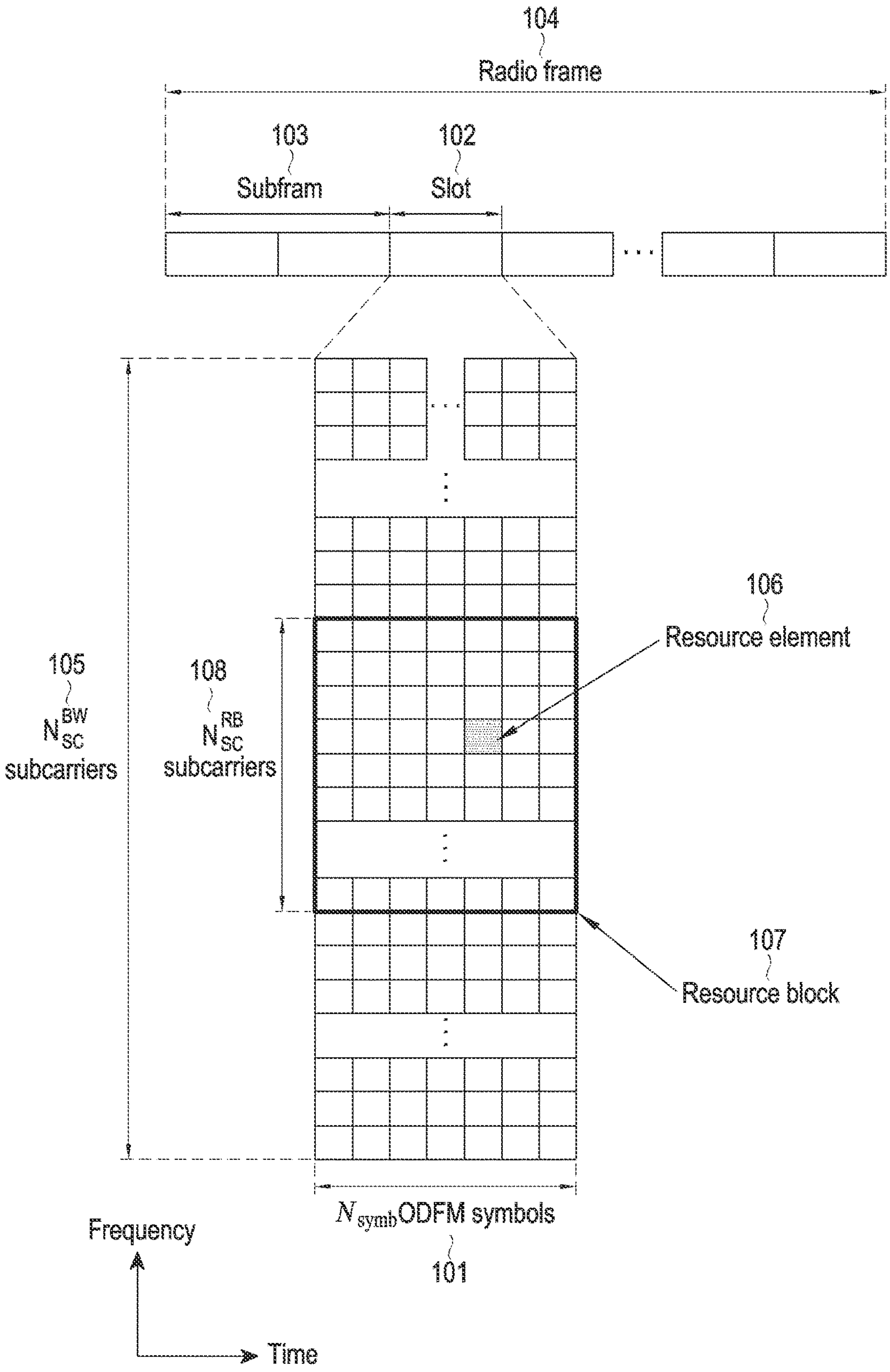
FIG. 1 is a diagram illustrating the basic structure of a time-frequency domain in an LTE communication system.

Embodiments of the disclosure will be described below in detail with reference to the accompanying drawings.

In describing the embodiments, a description of technical content which is well known in the technical field of the disclosure and not directly related to the disclosure will be avoided. This is done to make the subject matter of the disclosure clearer without obscuring it by omitting an unnecessary description.

For the same reason, some components are shown as exaggerated, omitted, or schematic in the accompanying drawings. In addition, each component is not true to the actual size. In each drawing, the same reference numerals are assigned to the same or corresponding components.

The advantages and features of the disclosure and a method for achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification.

It will be understood that each block of the flowchart illustrations and combinations of the flowchart illustrations may be implemented by computer program instructions. These computer program instructions may be loaded on a processor of a general purpose computer, a special purpose computer, or other programmable data processing equipment, such that the instructions, which are executed through the processor of the computer or other programmable data processing equipment, create means for implementing the functions specified in the flowchart block(s). These computer program instructions may also be stored in a computer-usable or computer-readable memory that may direct the computer or other programmable data processing equipment to function in a particular manner, such that the instructions stored in the computer-usable or computer-readable memory produce an article of manufacture including instruction means which implement the function specified in the flowchart block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions specified in the flowchart block(s).

Furthermore, the respective block diagrams may illustrate parts of modules, segments, or codes including one or more executable instructions for performing specific logic function(s). Moreover, it should be noted that the functions of the blocks may be performed in a different order in several alternative implementations. For example, two successive blocks may be performed substantially at the same time, or may be performed in reverse order according to their functions.

The term 'unit' as used herein means, but is not limited to, a software or hardware component, such as a field programmable gate array (FPGA) or application specific integrated circuit (ASIC), which performs certain tasks. A 'unit' may be configured to reside on an addressable storage medium and configured to be executed on one or more processors. Thus, a 'unit' may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and 'units' may be combined into fewer components and 'units' or further separated into additional components and 'units'. In addition, the components and 'units' may be implemented such that they are executed on one or more CPUs in a device or a secure multimedia card. Further, according to some embodiments, a 'unit' may include one or more processors.

The operation principle of the disclosure will be described below in detail with reference to the attached drawings. Lest it should obscure the subject matter of the disclosure, a detailed description of a generally known function or structure will be avoided. The terms as described later are defined in consideration of functions of the disclosure, and may be changed according to the intent of a user or operator, or customs. Therefore, the definitions should be made, not simply by the actual terms used but by the meanings of each term lying within. A base station (BS), which is an entity to allocate resources to a terminal, may be at least one of a gNode B, an eNode B, a Node B, a radio access unit, a base station controller, or a network node. A terminal may include a user equipment (UE), a mobile station (MS), a cellular phone, a smartphone, a computer, or a multimedia system capable of executing a communication function. Obviously, a terminal is not limited to the above examples. A description will be given below of a technique for receiving broadcasting information from a BS by a UE in a wireless communication system in the disclosure. The disclosure relates to a communication scheme for converging a 5th generation (5G) communication system for supporting a higher data rate than a beyond 4th generation (4G) system with Internet of things (IoT). The disclosure is applicable to intelligent services (e.g., smart homes, smart buildings, smart cities, smart cars or connected cars, healthcare, digital education, retail, security- and safety-related service, and so on) based on 5G communication technology and IoT-related technology.

Terms indicating broadcasting information, terms indicating control information, terms related communication coverage, terms indicating a state change (e.g., event), terms indicating network entities, terms indicating messages, terms indicating components of a device, and so on are provided by way of example, for convenience of description. Accordingly, the disclosure is not limited to the terms described below, and other terms having the same technical meanings may be used instead.

For convenience of description below, some terms and names defined in the $3^{rd}$ generation partnership project (3GPP) long term evolution (LTE) standards may be used. However, the disclosure is not limited by the above terms and names, and may be equally applied to systems conforming to other standards.

Beyond the initial voice-centered service, wireless communication systems are evolving into broadband wireless communication systems that provide high-speed, high-quality packet data services, such as 3GPP communication standards including high speed packet access (HSPA), LTE or evolved universal terrestrial radio access (E-UTRA), and LTE-advanced (LTE-A), and LTE-Pro, and 3GPP2 standards including high rate packet data (HRPD), ultra mobile broadband (UMB), and IEEE 802.16e.

A representative example of the broadband wireless communication systems, LTE adopts orthogonal frequency division multiplexing (OFDM) for downlink (DL), and single carrier frequency division multiple access (SC-FDMA) for uplink (UL). UL refers to a radio link in which a UE or MS transmits data or control signals to an eNB or BS, and DL refers to a radio link in which the eNB transmits data or control signals to the UE. In the above multiple access schemes, data or control information of each user is identified by allocating and operating time-frequency resources to carry the data or the control information in such a manner that they do not overlap, that is, orthogonality is established.

The post LTE communication system, that is, the 5G communication system should be able to freely reflect various requirements of users and service providers, and thus support services satisfying various requirements. Services considered for the 5G communication system include enhanced mobile broadband (eMBB), massive machine type communication (mMTC), ultra reliability low latency communication (URLLC), and so on.

According to an embodiment, eMBB aims to provide a higher data transmission rate than the data transmission rate supported by legacy LTE, LTE-A, or LTE-Pro. For example, eMBB should be able to provide up to 20 Gbps on DL and up to 10 Gbps on UL from the viewpoint of one eNB in the 5G communication system. An increased user perceived data rate should also be provided. To satisfy this requirement, transmission/reception techniques need improvement, including advanced multiple input multiple output (MIMO) transmission technology. In addition, use of a wider frequency bandwidth than 20 MHz used in current LTE in a frequency band at 3 to 6 GHz or above 6 GHz may satisfy the data transmission rate required for the 5G communication system.

In the 5G communication system, mMTC is considered to support application services such as Internet of things (IoT). In order to efficiently provide IoT, mMTC may require massive UE access support in a cell, improved UE coverage, an increased battery life, and reduced UE cost. Since IoT provides a communication function through attachment to various sensors and various devices, IoT should be able to support a large number of UEs (e.g., 1,000,000 UEs/km2) within a cell. In addition, since a UE supporting mMTC is highly likely to be located in a shaded area that the cell does not cover such as the basement of a building in view of the nature of the service, it may require wider coverage compared to other services provided by the 5G communication system. The UE supporting mMTC should be configured as a low-cost UE, and since it is difficult to frequently exchange the battery of the UE, a very long battery life time may be required.

URLLC, which is a cellular-based wireless communication service serving a specific (mission-critical) purpose, is used for remote control of a robot or a machine, industrial automation, unmanned aerial vehicles, remote healthcare, emergency alert, and so on, and should provide ultra-low latency and ultra-reliability communication. For example, a service supporting URLLC should satisfy an air interface latency less than 0.5 ms and has a requirement of a packet error rate of 10−5 or less. Therefore, for a service supporting URLLC, the 5G system should provide a smaller transmit time interval (TTI) than other services, and has a design requirement of allocation of wide resources in a frequency band. However, mMTC, URLLC, and eMBB are only examples of different service types, not limiting service types to which the disclosure is applied.

The above-described services considered in the 5G communication system should be provided through convergence based on one framework. That is, for efficient resource management and control, it is preferable that the services are integrally controlled and transmitted in a single system, rather than independently.

While embodiments of the disclosure are described below in the context of the LTE, LTE-A, LTE Pro, or NR system, by way of example, the embodiment of the disclosure may be applied to other communication systems having a similar technical background or channel type. In addition, the embodiments of the disclosure may be applied to other communication systems with some modifications made within a range that does not significantly depart from the scope of the disclosure as judged by those skilled in the art.

Frame structures of the LTE and LTE-A systems will be described below with reference to the drawings.

FIG. 1 is a diagram illustrating the basic structure of a time-frequency domain in an LTE communication system.

FIG. 1 illustrates the basic structure of a time-frequency domain which is a radio resource area carrying a data channel or a control channel in the LTE communication system.

In FIG. 1, a horizontal axis represents a time domain, and a vertical axis represents a frequency domain. A minimum transmission unit in the time domain is an OFDM symbol 101, one slot 102 includes $N_{symb}$ OFDM symbols 101, and one subframe 103 includes two slots. The length of a slot 102 is 0.5 ms, and the length of a subframe 103 is 1.0 ms. A radio frame 104 is a time-domain unit including 10 subframes 103. A minimum transmission unit in the frequency domain is a subcarrier 105, and the transmission bandwidth of a system transmission band includes a total of NBW subcarriers.

A basic resource unit in the time-frequency domain is a resource element (RE) 106, which may be represented by an OFDM symbol index and a subcarrier index. A resource block (RB) (or physical resource block (PRB)) 107 may be defined as $N_{symb}$ consecutive OFDM symbols 101 in the time domain by $N_{RB}$ consecutive subcarriers 108 in the frequency domain. Accordingly, one RB 107 includes $N_{symb}\times N_{RB}$ REs 106. Generally, $N_{symb}=7$, $N_{RB}=12$, and $N_{BW}$ and $N_{RB}$ are proportional to the bandwidth of the system transmission band, in the LTE system.

Downlink control information (DCI) in the LTE and LTE-A systems will be described below in detail.

In the LTE system, scheduling information for DL data or UL data is transmitted from an eNB to a UE through DCI. The DCI may include information indicating whether the scheduling information is for UL data or DL data, whether the DCI is compact DCI with a small size of control information, whether spatial multiplexing using multiple antennas is applied, and whether the DCI is DCI for power control. Additionally, a DCI format defined according to the above-described information may be applied. For example, DCI format 1, which is scheduling control information for DL data, is configured to include at least the following control information.

- Resource allocation type 0/1 flag: Indicates whether the resource allocation scheme is type 0 or type 1. Type 0 applies a bitmap scheme to allocate resources in resource block groups (RBGs). A basic unit of scheduling in the LTE system is a resource block (RB) represented as time and frequency domain resources, and an RBG includes a plurality of RBs and is a basic unit of scheduling in type 0. In type 1, a specific RB in an RBG is allocated.
- Resource block assignment: Indicates an RB allocated for data transmission. Represented resources are determined according to a system bandwidth and a resource allocation scheme.
- Modulation and coding scheme (MCS): Indicates a modulation scheme used for data transmission and the size of a TB, which is data to be transmitted.
- HARQ process number: Indicates an HARQ process number.
- New data indicator: Indicates whether the data transmission is an HARQ initial transmission or retransmission.
- Redundancy version: Indicates an HARQ redundancy version.
- Transmit Power Control (TPC) command for physical uplink control channel (PUCCH): Indicates a TPC command for a PUCCH, a UL control channel.

The DCI is channel-encoded and modulated and then transmitted through a physical downlink control channel (PDCCH), a DL physical control channel.

A cyclic redundancy check (CRC) is attached to the payload of a DCI message and scrambled with a radio network temporary identifier (RNTI) corresponding to the identifier of the UE. Different RNTIs are used depending on the purposes of the DCI message, for example, depending on a UE-specific data transmission, a power control command, or a random access response. In other words, the RNTI is included in the CRC calculation process, prior to transmission, rather than transmitted explicitly. When receiving the DCI message transmitted on the PDCCH, the UE may the CRC using an assigned RNTI, and when the CRC check result is correct, identify that the message is for the UE.

Figure 2:
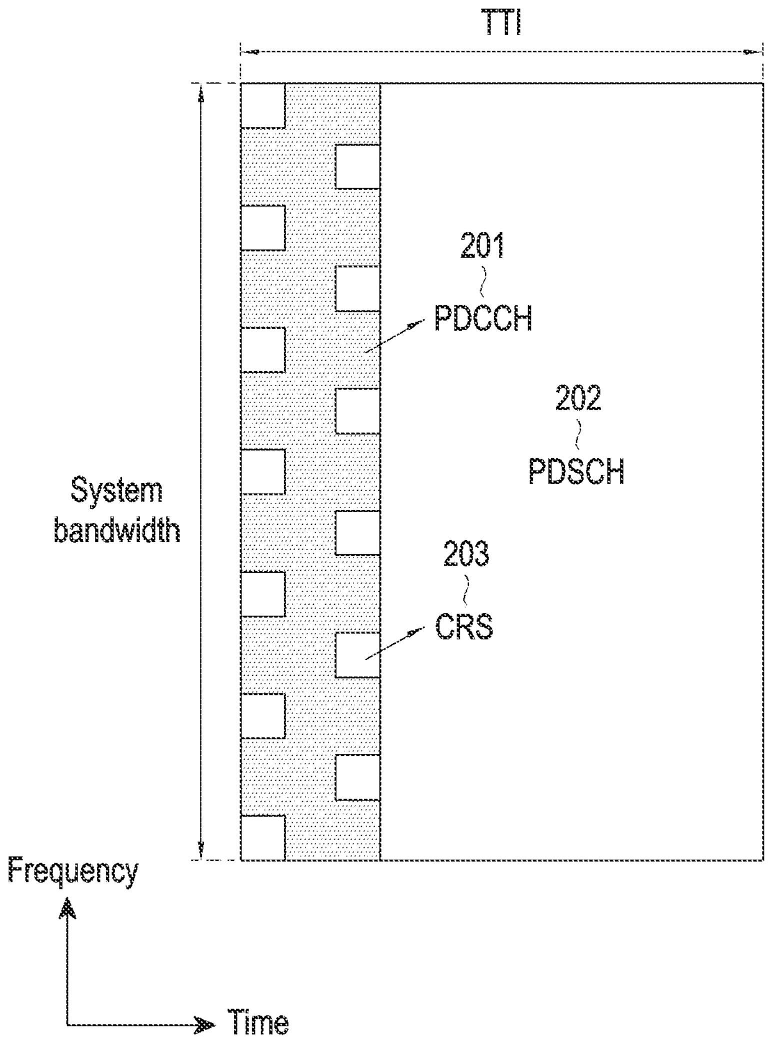
FIG. 2 is a diagram illustrating a downlink control channel in an LTE communication system.

FIG. 2 is a diagram illustrating a DL control channel in an LTE communication system.

FIG. 2 illustrates a DL physical channel, PDCCH carrying LTE DCI.

According to FIG. 2, a PDCCH 201 is time-multiplexed with a physical downlink shared channel (PDSCH) 202, which is a data transmission channel, and transmitted over a total system bandwidth. The region of the PDCCH 201 is represented as the number of OFDM symbols, which is indicated to the UE by a control format indicator (CFI) transmitted through a physical control format indicator channel (PCFICH).

The UE may be allowed to decode a downlink scheduling allocation as quickly as possible by allocating the PDCCH 201 to OFDM symbols at the beginning of a subframe, which may advantageously reduce the decoding delay of the downlink shared channel (DL-SCH), that is, an overall DL transmission latency.

One PDCCH carries one DCI message, and since multiple UEs may be scheduled simultaneously on DL and UL, multiple PDCCHs are transmitted simultaneously within each cell. A cell-specific reference signal (CRS) 203 is used as a reference signal for decoding the PDCCH 201. The CRS 203 is transmitted in every subframe across the entire band, and scrambling and resource mapping vary depending on a cell identity (ID). Since the CRS 203 is a reference signal commonly used by all UEs, UE-specific beamforming may not be used. Therefore, a multi-antenna transmission scheme for the LTE PDCCH is limited to open-loop transmission diversity. The number of CRS ports is implicitly indicated to the UE from decoding of a physical broadcast channel (PBCH).

Resource allocation of the PDCCH 201 is based on a control-channel element (CCE), and one CCE includes 9 resource element groups (REGs), that is, a total of 36 resource elements (REs). The number of CCEs required for the specific PDCCH 201 may be 1, 2, 4, or 8, which varies depending on the channel coding rate of the payload of the DCI message. In this way, different numbers of CCEs are used to implement link adaptation of the PDCCH 201.

The UE should detect a signal without knowledge of information about the PDCCH 201, and in LTE, a search space which is a set of CCEs is defined for blind decoding. The search space includes a plurality of CCE sets for each aggregation level (AL) of CCEs, which is implicitly defined through a function of a UE ID and a subframe number, rather than explicitly signaled. Within each subframe, the UE performs decoding on the PDCCH 201 for all possible resource candidates that may be created from CCEs in a configured search space, and processes information declared as valid for the UE through a CRC check.

Search spaces are classified into a UE-specific search space and a common search space. A specific group of UEs or all UEs may monitor the common search space of the PDCCH 201 to receive cell-common control information such as dynamic scheduling of system information or a paging message. For example, scheduling allocation information of a DL-SCH for transmission of system information block (SIB)-1 including cell operator information or the like may be received by monitoring the common search space of the PDCCH 201.

In LTE, the entire PDCCH region includes a set of CCEs in a logical area, and a search space with a set of CCEs exists. Search spaces are divided into a common search space and a UE-specific search space, and a search space for the LTE PDCCH is defined as follows.

---

The set of PDCCH candidates to monitor are defined in terms of search spaces, where a search space $S_k^{(L)}$ at aggregation level $L \in (1, 2, 4, 8\}$ is defined by a set of PDCCH candidates. For each serving cell on which PDCCH is monitored, the CCEs corresponding to *PDCCH* candidate *m* of the search space $S_k^{(L)}$ are given by $$L\{(Y_k + m') \bmod \lfloor N_{CCE,k}/L \rfloor\} + i$$

where $Y_k$ is defined below, $i = 0, \ldots, L-1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, \ldots, M^{(L)} - 1$. $M^{(L)}$ is the number of PDCCH candidates to monitor in the given search space.

Note that the carrier indicator field value is the same as ServCellIndex

For the common search spaces, $Y_k$ is set to 0 for the two aggregation levels $L = 4$ and $L = 8$.

For the *UE*-specific search space $S_k^{(L)}$ at aggregation level *L*, the variable $Y_k$ is defined by $$Y_k = (A \cdot Y_{k-1}) \bmod D$$

where $Y_{-1} = n_{RNTI} \neq 0$, $A = 39827$, $D = 65537$ and $k = \lfloor n_s/2 \rfloor$, $n_s$ is the slot number within a radio frame. The RNTI value used for $n_{RNTI}$ is defined in subclause 7.1 in downlink and subclause 8 in uplink.

---

According to the definition of the search space for the PDCCH described above, the UE-specific search space is not explicitly signaled but is implicitly defined through a function of a UE ID and a subframe number. In other words, since the UE-specific search space may change depending on the subframe number, it may change over time. This solves the problem (blocking problem) that a specific UE is not able to use the search space due to other UEs.

According to an embodiment, when a specific UE is not scheduled in a subframe because other UEs scheduled in the subframe are using all CCEs that the specific UE monitors, this problem may not occur in a next subframe because the search space changes over time. For example, even if the UE-specific search spaces of UE #1 and UE #2 partially overlap in a specific subframe, since the UE-specific search spaces change in each subframe, it may be expected that the overlap will be different in a next subframe.

According to the definition of the search space for the PDCCH described above, the common search space is defined as a preset CCEs because a specific group of UEs or all UEs should receive the PDCCH. In other words, the common search space does not change depending on a UE ID or a subframe number. Although the common search space exists for transmission of various system messages, it may also be used to transmit control information for individual UEs. In this manner, the common search space may also be used as a solution to the phenomenon that a UE may not be scheduled due to a lack of available resources in a UE-specific search space.

A search space is a set of candidate control channels including CCEs that the UE should attempt to decode at a given aggregation level. There are several aggregation levels at which 1, 2, 4, or 8 CCEs are aggregated, and thus the UE has a plurality of search spaces. For the LTE PDCCH, the number of PDCCH candidates that the UE should monitor within a search space defined according to an aggregation level is defined in the table below

TABLE 1

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 1, in the case of the UE-specific search space, aggregation levels {1, 2, 4, 8} are supported, and there are {6, 6, 2, 2} PDCCH candidates for the aggregations levels, respectively. In the case of the common search space, aggregation levels {4, 8} are supported, and there are {4, 2} PDCCH candidates for the aggregation levels, respectively. The reason that the common search space supports only the aggregation levels {4, 8} is to improve coverage characteristics because system messages generally have to reach the edge of the cell.

DCI transmitted in the common search space is defined only for specific DCI formats such as 0/1A/3/3A/1C for purposes such as system messages or power control for a UE group. A DCI format with spatial multiplexing is not supported in the common search space. A DL DCI format that should be decoded in the UE-specific search space varies depending on a transmission mode configured for the UE. Since the transmission mode is configured through radio resource control (RRC) signaling, there is no specified subframe number at which the configuration is effective for the UE. Therefore, the UE may operate not to lose communication by always performing decoding on DCI format 1A regardless of the transmission mode.

The method and search spaces for transmitting and receiving DL control channels and DCI in LTE and LTE-A have been described above.

A more detailed description will be given below of a DL control channel in the 5G communication system with reference to the drawings.

Figure 3:
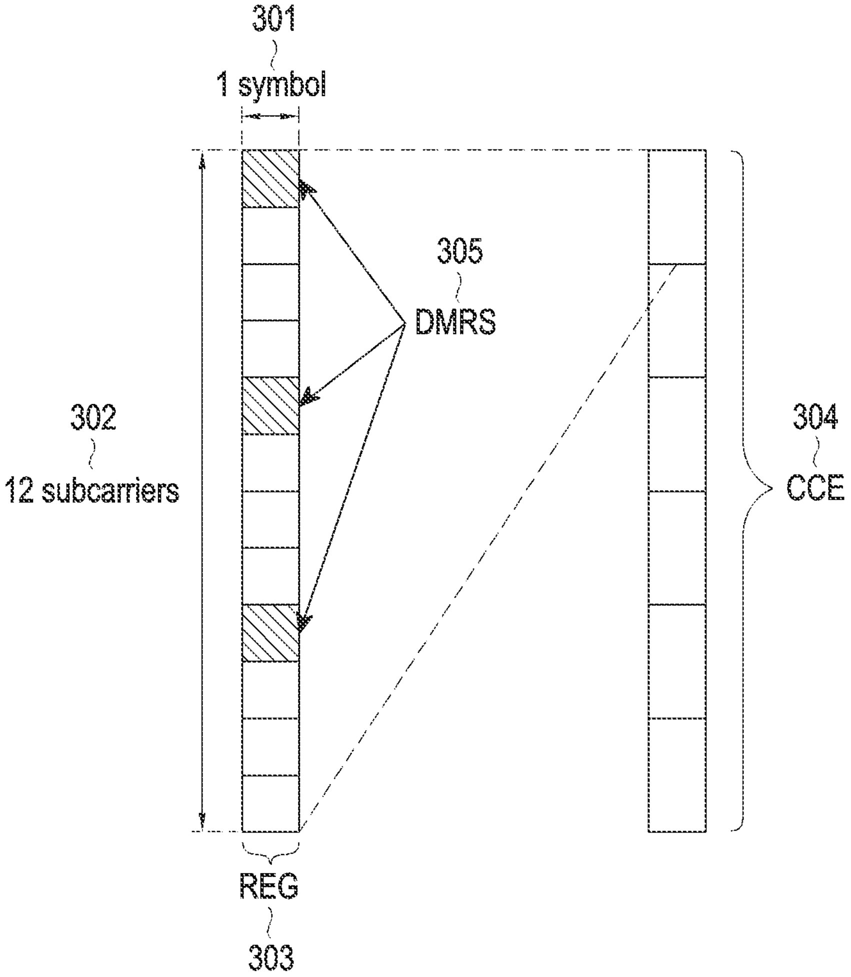
FIG. 3 is a diagram illustrating transmission resources of a downlink control channel in a 5G communication system.

FIG. 3 is a diagram illustrating transmission resources of a DL control channel in a 5G communication system.

FIG. 3 illustrates an exemplary basic unit of time and frequency resources that form the DL control channel in the 5G communication system.

According to FIG. 3, an REG 303, which is a basic unit of time and frequency resources that form a control channel, includes one OFDM symbol 301 on the time axis and 12 subcarriers 302 on the frequency axis, that is, one RB. A data channel and a control channel may be time-multiplexed in one subframe by assuming a basic time-axis unit to be one OFDM symbol 301 in configuring a basic unit of the control channel. Positioning the control channel before the data channel may reduce the processing time of a user and thus facilitates a latency requirement. Frequency multiplexing between the control channel and the data channel may be performed more efficiently by configuring a basic frequency-axis unit of the control channel as one RB 302.

Control channel regions of various sizes may be configured by concatenating REGs 303 illustrated in FIG. 3. For example, when a basic allocation unit of a DL control channel in 5G is a control channel element (CCE) 304, one CCE 304 may be include multiple REGs 303. When the REG 303 illustrated in FIG. 3 is taken as an example, the REG 303 may include 12 REs, and when one CCE 304 includes 6 REGs 303, this means that one CCE 304 may include 72 REs. When a DL control region is configured, the region may include multiple CCEs 304, and a specific DL control channel may be mapped to one or more CCEs 304 according to an aggregation level (AL) in the control region, for transmission. The CCEs 304 in the control region are distinguished by numbers, and the numbers may be assigned in a logical mapping method.

The basic unit of the DL control channel illustrated in FIG. 3, that is, the REG 303 may include both REs to which DCI is mapped and REs to which a demodulation reference signal (DMRS) 305, a reference signal for decoding the DCI, is mapped. As illustrated in FIG. 3, the DMRS 305 may be transmitted in three REs in one REG 303. For reference, since the DMRS 305 is transmitted using the same precoding as a control signal mapped to the REG 303, the UE may decode control information even without information about precoding applied by the eNB.

Figure 4:
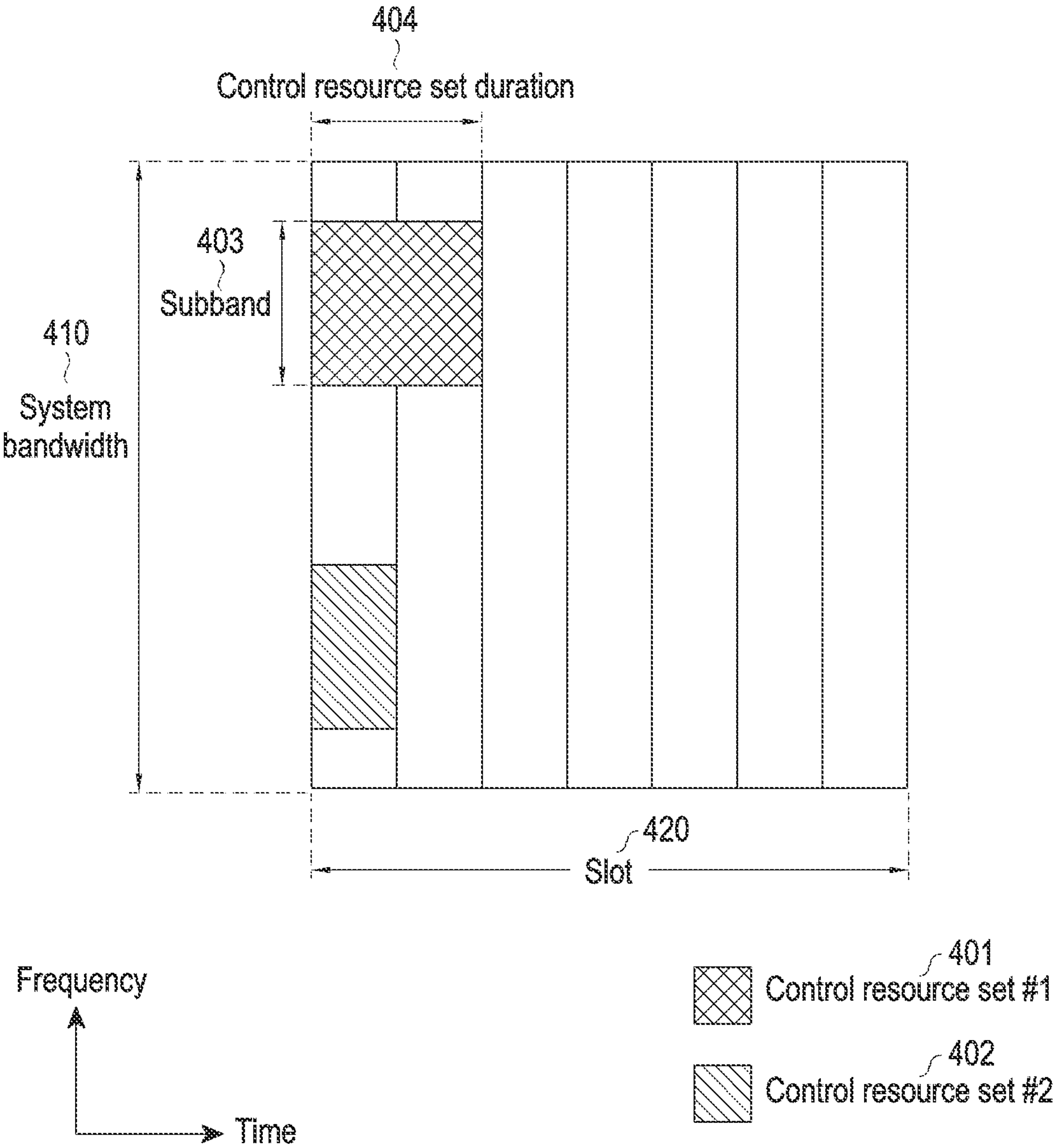
FIG. 4 is a diagram illustrating an exemplary configuration of a control region in a 5G communication system.

FIG. 4 is a diagram illustrating an exemplary control region in a 5G communication system.

FIG. 4 illustrates an exemplary control resource set (CORESET) in which a DL control channel is transmitted in a 5G communication system.

The example in FIG. 4 is based on the assumption that one slot includes 7 OFDM symbols. FIG. 4 illustrates an example in which two control regions (control region #1 401 and control region #2 402) are configured in a system bandwidth 410 on the frequency axis and one slot 420 on the time axis. The frequency of the control regions 401 and 402 may be set to a specific subband 403 in the total system bandwidth 410. The time length of the control regions 401 and 402 may be set to one or more OFDM symbols and defined as a control resource set duration 404. In the example of FIG. 4, control region #1 401 is configured with a control resource set duration of 2 symbols, and control region #2 402 is configured with a control resource set duration of 1 symbol.

The above-described control region in 5G may be configured for the UE through higher layer signaling (e.g., system information, a master information block (MIB), or RRC signaling) of the eNB. Configuring a control region for a UE means providing information such as the position of the control region, a subband, resource allocation of the control region, and a control resource set duration. For example, the information may include information described in Table 2.

TABLE 2

| |
|---|
| Configuration information 1. Frequency-axis RB allocation information |
| Configuration information 2. Starting symbol of control region |
| Configuration information 3. Symbol duration of control region |
| Configuration information 4. REG bundling size (2 or 3 or 6) |
| Configuration information 5. Transmission mode (interleaved transmission scheme or non-interleaved transmission scheme) |
| Configuration information 6. DMRS configuration information (precoder granularity) |

TABLE 2-continued

| |
|---|
| Configuration information 7. Search space type (common search space, group-common search space, UE-specific search space) |
| Configuration information 8. DCI format to be monitored in corresponding control region |
| Others |

The configuration information in Table 2 is an example of the disclosure, and various information required for transmitting the DL control channel may be configured for the UE, in addition to the configuration information in Table 2.

Now, DCI in 5G will be described below in detail.

In the 5G system, scheduling information for UL data (physical uplink shared channel (PUSCH)) or DL data (PDSCH) is transmitted from the eNB to the UE through DCI.

The UE may monitor a fallback DCI format and a non-fallback DCI format for the PUSCH or the PDSCH. The fallback DCI format may be configured with fields fixed between the eNB and the UE, and the non-fallback DCI format may include configurable fields.

According to an embodiment, the fallback DCI that schedules the PUSCH may include information in Table 3.

TABLE 3

| |
|---|
| - Identifier for DCI formats - [1] bit |
| – Frequency domain resource assignment – $\left[\left\lceil \log_2\left(N_{RB}^{UL,BWP}\left(N_{RB}^{UL,BWP}+1\right)/2\right)\right\rceil\right]$ bits |
| - Time domain resource assignment - X bits |
| - Frequency hopping flag - 1 bit. |
| - Modulation and coding scheme - [5] bits |
| - New data indicator - 1 bit |
| - Redundancy version - [2] bits |
| - HARQ process number - [4] bits |
| - TPC command for scheduled PUSCH - [2] bits |
| - UL/SUL indicator - 0 or 1 bit |

According to an embodiment, the non-fallback DCI that schedules the PUSCH may include information in Table 4.

TABLE 4

| |
|---|
| - Carrier indicator - 0 or 3 bits |
| - Identifier for DCI formats - [1] bits |
| - Bandwidth part indicator - 0, 1 or 2 bits |
| - Frequency domain resource assignment |
| • For resource allocation type 0, $\left\lceil N_{RB}^{UL,BWP}/P\right\rceil$ bits |
| • For resource allocation type 1, $\left\lceil \log_2\left(N_{RB}^{UL,BWP}\left(N_{RB}^{UL,BWP}+1\right)/2\right)\right\rceil$ bits |
| - Time domain resource assignment - 1, 2, 3, or 4 bits |
| - VRB-to-PRB mapping - 0 or 1 bit, only for resource allocation type 1. |
| • 0 bit if only resource allocation type 0 is configured; |
| • 1 bit otherwise. |
| - Frequency hopping flag - 0 or 1 bit, only for resource allocation type 1. |
| • 0 bit if only resource allocation type 0 is configured; |
| • 1 bit otherwise. |
| - Modulation and coding scheme - 5 bits |
| - New data indicator - 1 bit |
| - Redundancy version - 2 bits as defined in section x.x of [6, TS38.214] |
| - HARQ process number - 4 bits |
| - 1st downlink assignment index - 1 or 2 bits |
| • 1 bit for semi-static HARQ-ACK codebook; |
| • 2 bits for dynamic HARQ-ACK codebook with single HARQ-ACK codebook. |
| - 2nd downlink assignment index - 0 or 2 bits |
| • 2 bits for dynamic HARQ-ACK codebook with two HARQ-ACK sub-codebooks; |
| • 0 bit otherwise. |
| - TPC command for scheduled PUSCH - 2 bits |
| - $SRS$ resource indicator $-\left\lceil \log_2\left(\sum_{k=1}^{L_{max}}\binom{N_{SRS}}{k}\right)\right\rceil$ or $\lceil \log_2(N_{SRS})\rceil$ bits |

TABLE 4-continued

| |
|---|
| • $\left\lceil \log_2\left(\sum_{k=1}^{L_{max}} \binom{N_{SRS}}{k}\right)\right\rceil$ bits for non−codebook based *PUSCH* transmission; |
| • $\lceil \log_2 (N_{SRS}) \rceil$ bits for codebook based PUSCH transmission. |
| - Precoding information and number of layers - up to 6 bits |
| - Antenna ports - up to 5 bits |
| - SRS request - 2 bits |
| - CSI request - 0, 1, 2, 3, 4, 5, or 6 bits |
| - CBG transmission information - 0, 2, 4, 6, or 8 bits |
| - PTRS-DMRS association - 2 bits. |
| - beta_offset indicator - 2 bits |
| - DMRS sequence initialization - 0 or 1 bit |
| - UL/SUL indicator - 0 or 1 bit |

According to an embodiment, the fallback DCI that schedules the PDSCH may include information in Table 5.

TABLE 5

| |
|---|
| - Identifier for DCI formats - [1] bit |
| - Frequency domain resource assignment – $[\lceil \log_2(N_{RB}^{UL,BWP}(N_{RB}^{UL,BWP}+1)/2)\rceil]$ bits |
| - Time domain resource assignment - X bits |
| - VRB-to-PRB mapping - 1 bit. |
| - Modulation and coding scheme - [5] bits |
| - New data indicator - 1 bit |
| - Redundancy version - [2] bits |
| - HARQ process number - [4] bits |
| - Downlink assignment index - 2 bits |
| - TPC command for scheduled PUCCH - [2] bits |
| - PUCCH resource indicator - [2] bits |
| - PDSCH-to-HARQ feedback timing indicator - [3] bits |

According to an embodiment, the non-fallback DCI that schedules the PDSCH may include information in Table 6.

TABLE 6

| |
|---|
| - Carrier indicator - 0 or 3 bits |
| - Identifier for DCI formats - [1] bits |
| - Bandwidth part indicator - 0, 1 or 2 bits |
| - Frequency domain resource assignment |
| • For resource allocation type 0, $\lceil N_{RB}^{DL,BWP}/P \rceil$ bits |
| • For resource allocation type 1, $\lceil \log_2(N_{RB}^{DL,BWP}(N_{RB}^{DL,BWP}+1)/2)\rceil$ bits |
| - Time domain resource assignment - 1, 2, 3, or 4 bits |
| - VRB-to-PRB mapping - 0 or 1 bit, only for resource allocation type 1. |
| • 0 bit if only resource allocation type 0 is configured; |
| • 1 bit otherwise. |
| - PRB bundling size indicator - 1 bit |
| - Rate matching indicator - 0, 1, 2 bits |
| - ZP CSI-RS trigger - X bits |
| For transport block 1: |
| - Modulation and coding scheme - 5 bits |
| - New data indicator - 1 bit |
| - Redundancy version - 2 bits |
| For transport block 2: |
| - Modulation and coding scheme - 5 bits |
| - New data indicator - 1 bit |
| - Redundancy version - 2 bits |
| - HARQ process number - 4 bits |
| - Downlink assignment index - 0 or 4 bits |
| - TPC command for scheduled PUCCH - 2 bits |
| - PUCCH resource indicator |
| - PDSCH-to-HARQ_feedback timing indicator - 3 bits |
| - Antenna ports - up to 5 bits |
| - Transmission configuration indication - 3 bits |
| - SRS request - 2 bits |
| - CBG transmission information - 0, 2, 4, 6, or 8 bits |
| - CBG flushing out information - 0 or 1 bit |
| - DMRS sequence initialization - 0 or 1 bit |

The DCI may be transmitted through a physical downlink control channel (PDCCH) after channel encoding and modulation. The payload of a DCI message is attached with a cyclic redundancy check (CRC), and the CRC is scrambled with a radio network temporary identifier (RNTI) corresponding to a UE identity.

Different RNTIs are used depending on the purposes of a DCI message, for example, depending on a UE-specific data transmission, a power control command, or a random access response. An RNTI is included in a CRC calculation process, rather than transmitted explicitly. When the UE receives a DCI message transmitted on a PDCCH, the UE may check the CRC using an assigned RNTI. When the CRC check is correct, the UE may identify that the message is for the UE.

For example, DCI scheduling a PDSCH for system information (SI) may be scrambled with an SI-RNTI. DCI that schedules a PDSCH for a random access response (RAR) message may be scrambled with an RA-RNTI. DCI that schedules a PDSCH for a paging message may be scrambled with a P-RNTI. DCI that indicates a slot format indicator (SFI) may be scrambled with an SFI-RNTI. DCI that indicates TPC may be scrambled with a TPC-RNTI. DCI that schedules a UE-specific PDSCH or PUSCH may be scrambled with a cell RNTI (C-RNTI).

When a specific UE receives a data channel, that is, a PUSCH or PDSCH, scheduled by the above PDCCH, data is transmitted and received with a DMRS in a corresponding scheduled resource area.

Figure 5:
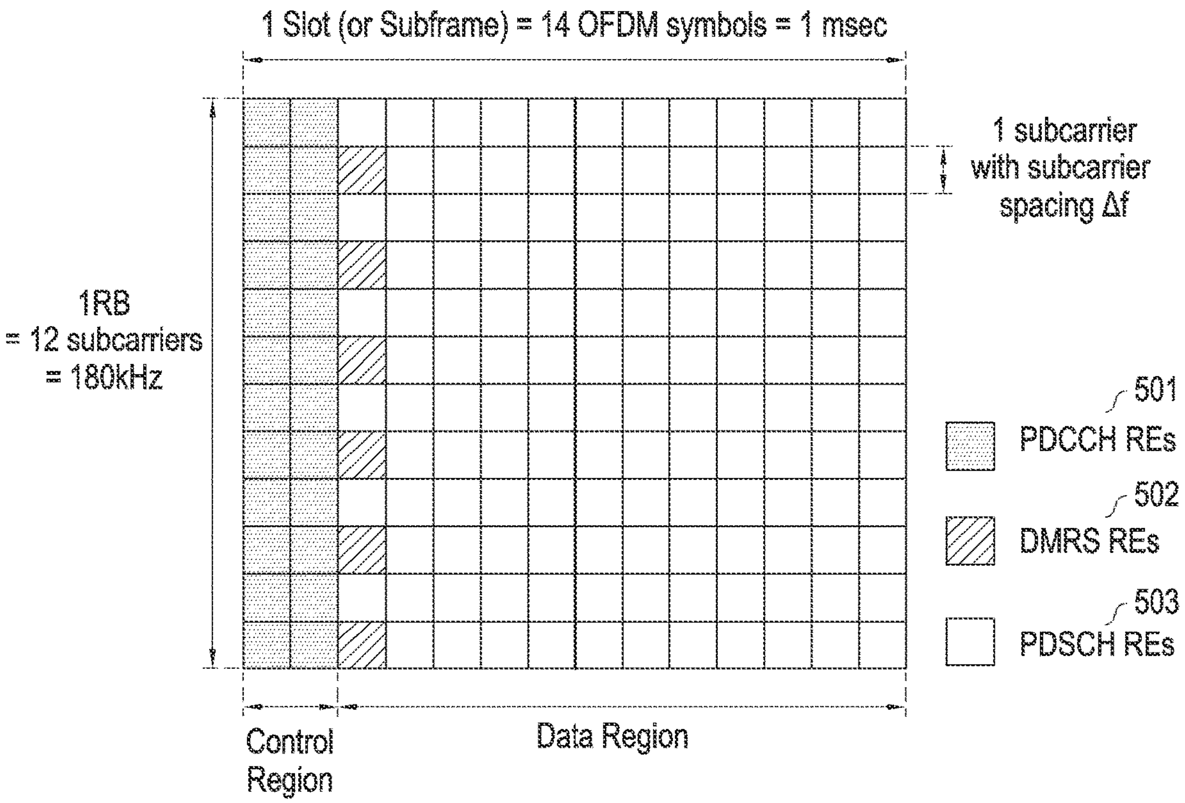
FIG. 5 is a diagram illustrating an exemplary configuration of a downlink RB structure in a 5G communication system.

FIG. 5 is a diagram illustrating an exemplary configuration of a DL RB structure in a 5G communication system.

More specifically, FIG. 5 illustrates a case where a specific UE is configured to use 14 OFDM symbols as one slot (or subframe) on DL, a PDCCH is transmitted in the first two OFDM symbols, and a DMRS is transmitted in the third symbol. In the case of FIG. 5, a PDSCH is transmitted with data mapped to REs where the DMRS is not transmitted in the third symbol and to the REs of the fourth to last symbols in a specific RB where the PDSCH is scheduled. A subcarrier spacing Δf represented in FIG. 5 is 15 kHz for the LTE/LTE-A system and one of {15, 30, 60, 120, 240, 480} kHz for the 5G system.

As described above, the eNB needs to transmit a reference signal to measure a DL channel state in a cellular system. In the 3GPP LTE-A system, the UE may measure a channel state between the UE and the eNB using a CRS or CSI-RS transmitted by the eNB.

The channel state should be measured by taking various factors into account, including the amount of interference on DL. The amount of interference on the DL includes an interference signal and thermal noise generated by an antenna belonging to a neighboring eNB, and is important for the UE to determine the channel state on the DL. For example, when an eNB with a single transmission antenna transmits a signal to a UE with a single reception antenna, the UE should determine Es/Io by determining energy per symbol that may be received on the DL and the amount of interference to be received simultaneously in a period in which a corresponding symbol is received, from a reference signal received from the eNB. The determined Es/Io is converted to a data rate or its equivalent value and transmitted to the eNB in the form of a channel quality indicator (CQI), and the eNB may use the CQI in determining a data rate for a transmission to be performed.

More specifically, in the LTE-A system, the UE may feed back information about a DL channel state to the eNB so that the eNB may use the information for DL scheduling. That is, the UE measures a DL reference signal transmitted by the eNB and feeds back information extracted from the measurement to the eNB in a form defined by the LTE/LTE-A standards. As described above, in LTE/LTE-A, information that a UE feeds back may be referred to as channel state information (CSI), and the CSI may include the following three types of information.

- Rank Indicator (RI): The number of spatial layers that the UE may receive in the current channel state
- Precoding Matrix Indicator (PMI): An indicator indicating a precoding matrix that the UE prefers to use in the current channel state
- Channel Quality Indicator (CQI): The maximum data rate that the UE may receive in the current channel state A CQI may be replaced by a signal to interference plus noise ratio (SINR), a maximum error correction code rate and modulation scheme, data efficiency per frequency, and so on, which may be used similarly to a maximum data rate.

The RI, PMI, and CQI may have meanings in relation to each other. For example, a precoding matrix supported by LTE/LTE-A is defined differently for each rank. Therefore, PMI value X for an RI value of 1 and PMI value X for an RI value of 2 may be interpreted differently.

Further, for example, when the UE determines the CQI, the UE assumes that the eNB applies PMI value X that the UE indicates to the eNB. That is, when the UE reports RI_X, PMI_Y, and CQI_Z to the eNB, this amounts to reporting that the UE is capable of receiving a data rate corresponding to CQI_Z when the rank is RI_X and the PMI is PMI_Y. As such, when calculating the CQI, the UE assumes a transmission scheme to be performed by the eNB so that optimized performance may be achieved when an actual transmission is performed using the transmission scheme.

In LTE/LTE-A, the CSI, RI, PMI, and CQI that the UE feeds back may be either periodic or aperiodic. When the eNB wants to aperiodically obtain CSI from a specific UE, the eNB may configure aperiodic feedback (or aperiodic CSI reporting) to be performed, using an aperiodic feedback indicator (or CSI request field or CSI request information) includes in DCI for the UE. Further, when receiving an indicator set to indicate aperiodic feedback in an $n^{th}$ subframe, the UE may perform a UL transmission by including aperiodic feedback information (or CSI) in a data transmission in an $(n+k)^{th}$ subframe. Herein, k is a parameter defined in the 3GPP LTE Release 11 standard, which is 4 for frequency division duplexing (FDD) and may be defined as Table 7 for time division duplexing (TDD).

Table 7 Value of k for each subframe number n in TDD UL/DL configuration.

TABLE 7

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, the feedback information (or CSI) includes an RI, a PMI, and a CQI, and depending on a feedback configuration (or channel state reporting configuration), the RI and the PMI may not be fed back.

Figure 6:
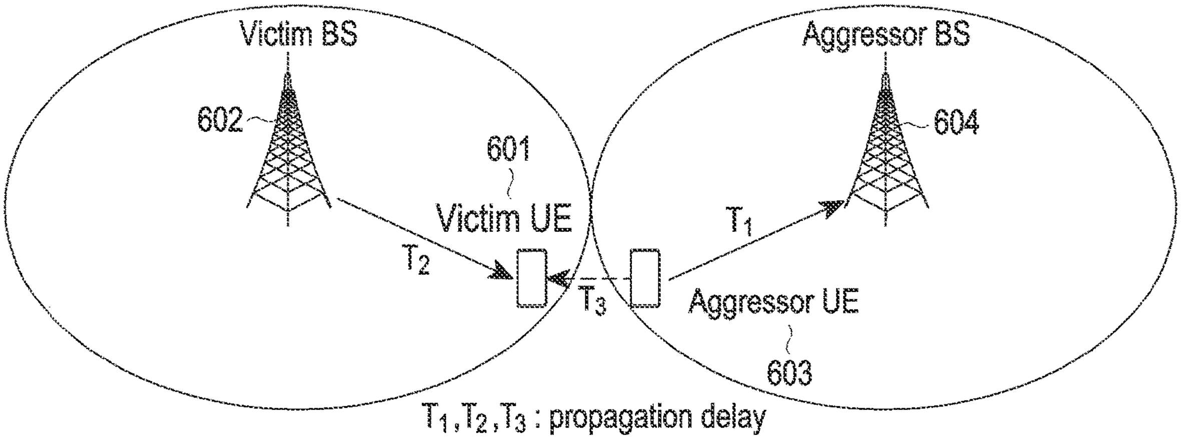
FIG. 6 is a diagram illustrating exemplary occurrence of cross link interference (CLI) according to an embodiment of the disclosure.

FIG. 6 is a diagram illustrating exemplary occurrence of cross link interference (CLI) according to an embodiment of the disclosure.

FIG. 6 illustrates exemplary CLI occurrence.

When the transmission directions of two neighboring nodes are opposite to each other, CLI occurs. For example, in FIG. 6, a left UE 601 is receiving a DL signal from a BS 602 to which it belongs, and a right UE 603 is transmitting a UL signal to a BS 604 to which it belongs. When the two UEs are close, the UL signal transmitted by the right UE 604 may act as interference during reception of the DL signal at the left UE 603, as indicated by a dotted line in FIG. 6. Such interference is referred to as CLI, and CLI between UEs is considered in the disclosure, as illustrated in FIG. 6. A UE acting as an interference source is referred to as an aggressor UE, and a BS to which the aggressor UE belongs is referred to as an aggressor BS. In addition, a UE affected by CLI is referred to as a victim UE, and a BS to which the victim UE belongs is referred to as a victim BS.

In FIG. 6, a propagation delay corresponding to the distance between the victim BS and the victim UE is represented by $T_1$, a propagation delay corresponding to the distance between the aggressor BS and the aggressor UE is represented by $T_2$, and a propagation delay corresponding to the distance between the victim UE and the aggressor UE is represented by $T_3$.

The magnitude of CLI between UEs considered in the disclosure is measured through sounding reference signal (SRS)-reference signal received power (RSRP) or a CLI-received signal strength indication (CLI-RSSI) at a victim UE. A CLI-RSSI measurement value may be obtained by measuring the strength of a received signal at a specific time and frequency position by the victim UE. An SRS-RSRP measurement value may be obtained by measuring the RSRP of an SRS transmitted from an aggressor UE at a specified time and frequency position by the victim UE. In this case, the aggressor UE transmits an SRS for the purpose of channel estimation at an aggressor BS or transmits a separately configured SRS to allow the victim UE to measure CLI, and the disclosure is applicable to both cases.

Figure 7:
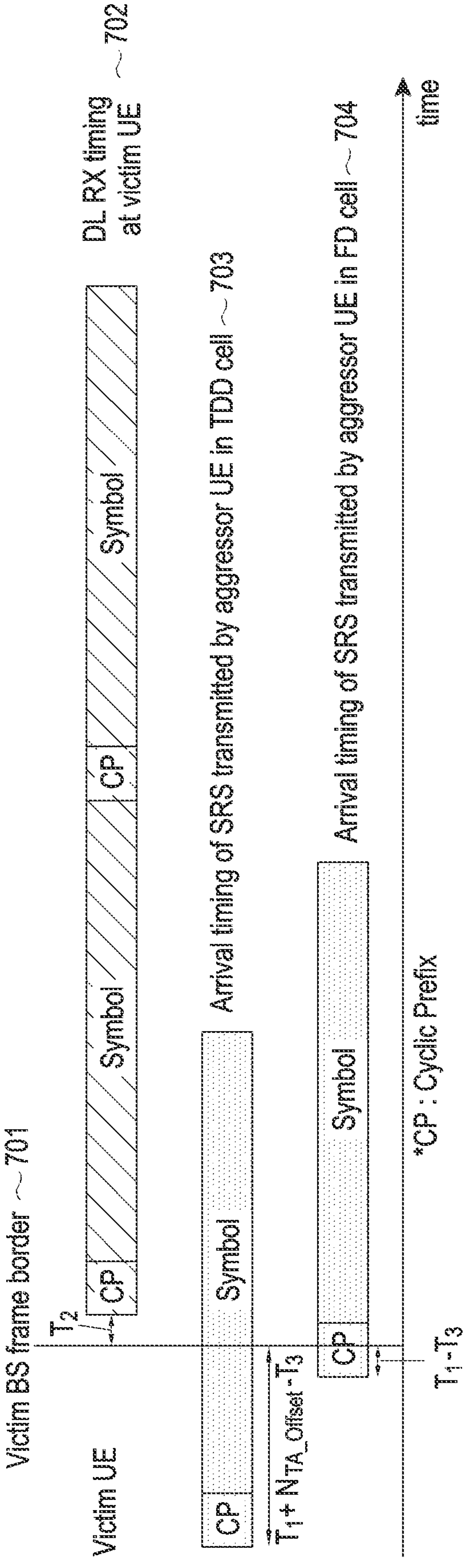
FIG. 7 is a diagram illustrating timing mismatch caused by CLI according to an embodiment of the disclosure.

FIG. 7 is a diagram illustrating timing mismatch caused by CLI according to an embodiment of the disclosure.

FIG. 7 is a diagram illustrating an example of the arrival timing of an SRS at the victim UE, which varies depending on a transmission and reception mode of the aggressor BS in FIG. 6.

As one example of categorizing the transmission and reception modes of an aggressor BS in the disclosure, it may be considered to categorize them according to whether the BS is capable of simultaneously performing a DL signal transmission and a UL signal reception. For example, when the BS transmits and receives a signal in time division duplexing (TDD), the BS is not capable of simultaneously performing a DL signal transmission and a UL signal reception. On the contrary, for example, in in-band full duplex (FD), the BS is capable of simultaneously performing a DL signal transmission and a UL signal reception. While only FD is taken as an example of the transmission and reception mode that allows the BS to simultaneously perform a DL signal transmission and a UL signal reception in the above example and FIG. 7, embodiments of the disclosure are applicable to various other transmission and reception modes in which a BS is generally capable of simultaneously performing a DL signal transmission and a UL signal reception.

In FIG. 7, reference numeral 701 denotes a frame reference line of the victim BS. Accordingly, a timing 702 at which the victim UE receives a DL signal from the victim BS is delayed from the frame reference line 701 of the victim BS by $T_2$. $T_2$ is the propagation delay corresponding to the distance between the victim BS and the victim UE, as described with reference to FIG. 6. Although FIG. 7 illustrates a case where the frame reference lines of a victim BS and an aggressor BS coincide, embodiments of the disclosure may also be applied to a case where the frame reference lines of the victim BS and the aggressor BS do not coincide.

Reference numeral 703 denotes a timing at which an SRS transmitted by the aggressor UE belonging to the aggressor BS arrives at the victim UE, when the transmission and reception mode of the aggressor BS is TDD, from which it may be seen that the SRS arrives at the victim UE earlier than the frame reference line of the victim BS by $T_1+N_{TA\_offset}-T_3$. While the number of SRS symbols is 1 in the illustrated case of FIG. 7, the disclosure is also capable to the number of SRS symbols being equal to or greater than 1. As described before with reference to FIGS. 6, $T_1$ and $T_3$ are the propagation delays corresponding to the distance between the aggressor BS and the aggressor UE and the distance between the aggressor UE and the victim UE, respectively. In addition, $N_{TA\_offset}$ is a timing advance offset, which is a parameter to compensate for a switching delay required for switching between transmission and reception of the BS, when the transmission and reception mode of the BS is TDD. In other words, when the transmission and reception mode of the BS is TDD, the UE belonging to the BS should adjust a UL signal transmission timing by taking into account the timing advance offset as well as the propagation delay between the BS and the UE in order to enable arrival of a transmitted UL signal at the BS to match the frame reference line of the BS.

As a consequence, in reference numeral 703, the aggressor UE belonging to the aggressor BS operating in TDD as its transmission and reception mode transmits an SRS by advancing an SRS transmission timing for CLI measurement from the frame reference line of the aggressor BS by $T_1+N_{TA\_offset}$, and the arrival timing of the SRS at the victim UE is finally advanced from the frame reference line of the victim BS by $T_1+N_{TA\_offset}-T_3$ due to the propagation delay between the two UEs.

Reference numeral 704 denotes a timing at which an SRS transmitted from the aggressor UE belonging to the aggressor BS to the victim UE, when the transmission and reception mode of the aggressor BS is FD, from which it may be seen that the SRS arrives at the victim UE earlier than the frame reference line of the victim BS by $T_1$-$T_3$. Compared to reference numeral 703 denoting the case where the transmission and reception mode of the aggressor BS is TDD, it may be seen that the arrival timing of the SRS is delayed by $N_{TA\_offset}$. This is because when the transmission and reception mode of the aggressor BS is FD, a DL signal transmission and a UL signal reception occur simultaneously at the BS all the time, and the resulting absence of switching between transmission and reception causes no switching delay. In other words, since this switching delay does not occur at the aggressor BS, when transmitting a UL SRS signal to the aggressor BS, the aggressor UE sets the transmission timing by advancing it by the propagation delay $T_1$ corresponding to the distance between the aggressor BS and the aggressor UE, and the transmitted signal is delayed by the propagation delay between the aggressor UE and the victim UE, so that the final arrival timing of the SRS at the victim UE is advanced from the frame reference line of the victim BS by $T_1$-$T_3$.

To allow the victim UE to measure SRS-RSRP without a measurement error, a CLI measurement timing, that is, an SRS detection timing of the victim UE should coincide with the arrival timing of the SRS at the victim UE, or when there is a mismatch, a timing error should be within a cyclic prefix (CP). However, as described above with reference to reference numerals 703 and 704, the timing at which the SRS transmitted by the aggressor UE arrives at the victim UE differs by the timing advance offset, $N_{TA\_offset}$, depending on the transmission and reception mode of the aggressor BS, that is, whether the aggressor BS is capable of simultaneously performing a DL signal transmission and a UL signal reception. Further, the victim UE may not obtain information based on which to determine the transmission and reception mode of its neighboring cell, the aggressor BS, unless otherwise indicated by the victim BS. In CLI measurement, therefore, the victim BS needs to specify a CLI measurement timing, that is, an SRS detection timing to enable the victim UE to measure SRS-RSRP without an error, despite the arrival timing of an SRS transmitted by the aggressor UE, which varies depending on the transmission and reception mode of the aggressor BS.

While FIG. 7 illustrates an example in which a victim UE measures SRS-RSRP, a victim BS may also indicate a CL-RSSI measurement timing to the victim UE in the same manner, when the victim UE measures a CLI-RSSI in the disclosure.

Embodiments of the disclosure will be described below in more detail with reference to the accompanying drawings. While the embodiments of the disclosure are described below in the context of an LTE or LTE-A system by way of example, the embodiments of the disclosure may also be applied to other communication systems having similar technical backgrounds or channel types. For example, the communication systems to which the embodiments of the disclosure are applicable may include 5G mobile communication technologies (5G and new radio (NR)) developed after LTE-A. Accordingly, the embodiments of the disclosure may be applied to other communication systems with some modifications made without substantially departing from the scope of the disclosure as determined by those skilled in the art.

Further, lest it should obscure the subject matter of the disclosure, a detailed description of a related function or configuration is avoided in describing the disclosure. The terms as described later are defined in consideration of functions of the disclosure, and may be changed according to the intent of a user or operator, or customs. Therefore, the definitions should be made in the context of the disclosure as a whole.

Embodiment 1

Embodiment 1 relates to a method for indicating a CLI measurement timing to a UE by a BS, when CLI is measured.

In an example in which the BS indicates a CLI measurement timing to the UE, the BS indicates a minimum timing advance value that should be applied during CLI measurement. Accordingly, the victim UE may determine a CLI measurement timing by applying a timing advance equal to or greater than the value received from the victim BS, and the specific value may be determined by the UE itself. An example of a reference line for applying the timing advance is a reception timing of a DL signal at the victim UE, and other reference lines are also available.

Apart from the above example, the BS may indicate a CLI measurement timing in various manners including directly indicating a timing advance value to be applied to the UE. In addition to directly indicating a CLI measurement timing to the UE by the BS, the BS may also transmit indirect information so that the UE determines a CLI measurement timing based on the information. For example, the BS may indicate the transmission and reception mode of an aggressor BS to the UE, so that the UE may determine a CLI measurement timing based on the indicated transmission and reception mode of the aggressor BS.

The following methods may be considered for a BS to indicate a CLI measurement timing to a UE during CLI measurement.

(Embodiment 1—Method 1) A CLI measurement timing is indicated on an aggressor UE basis.

(Embodiment 1—Method 2) A single CLI measurement timing is indicated.

In Method 1, a CLI measurement timing that should be applied by a victim UE according to the transmission and reception mode of an aggressor BS to which an aggressor UE belongs is individually indicated to the victim UE on an aggressor UE basis. In this case, Method 1 is applicable in an SRS-RSRP measurement scheme in which each aggressor UE may transmit a different SRS, not to a CLI-RSSI measurement scheme in which the aggregate strength of received signals is measured without distinguishing signals transmitted by aggressor UEs.

Unlike Method 1, a BS indicates a single CL measurement timing, instead of a CLI measurement timing for each individual aggressor UE, in Method 2. Accordingly, Method 2 may be applied to both SRS-RSRP measurement and CLI-RSSI measurement, compared to Method 1 which is not applied to CLI-RSSI measurement.

Figure 8:
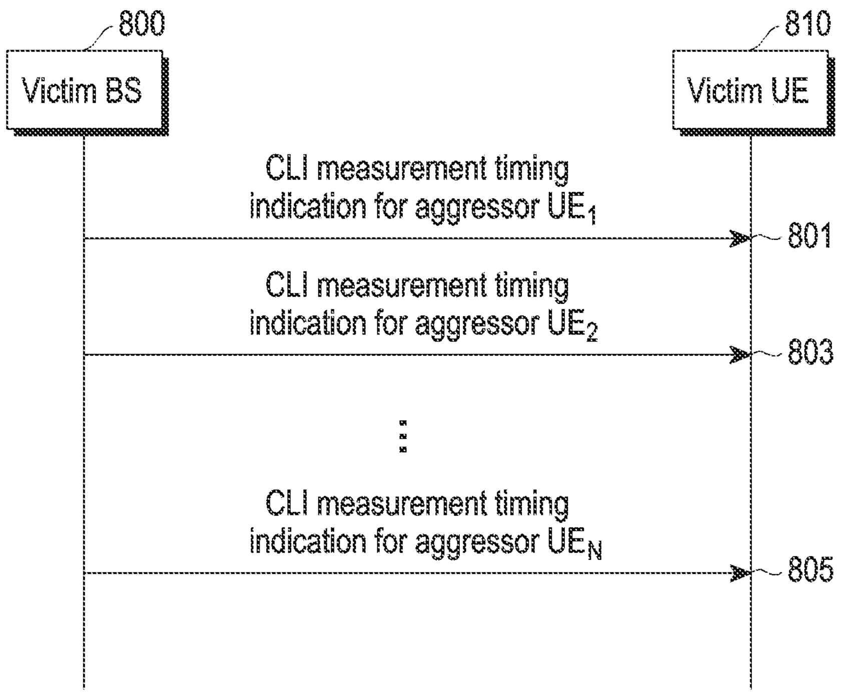
FIG. 8 is a diagram illustrating an exemplary method for indicating a timing advance to a user equipment (UE) by a base station (BS) according to an embodiment of the disclosure.

FIG. 8 is a diagram illustrating an exemplary method for indicating a timing advance to a UE by a BS according to an embodiment of the disclosure.

FIG. 8 illustrates a method for indicating a CLI measurement timing for each aggressor UE to a UE according to Method 1 of Embodiment 1 described above. As described above, the UE may measure SRS-RSRP in Method 1. The number of aggressor UEs that transmit SRSs is denoted by N, and the N aggressor UEs may be denoted by Aggressor $UE_1$, Aggressor $UE_2$, . . . , Aggressor $UE_N$. A victim BS 800 may indicate a different CLI measurement timing to a victim UE 810 according to a transmission and reception mode of a BS to which each aggressor UE belongs. In this case, the CLI measurement timing may be specified by the RRC, DCI, a MAC CE, or the like, and the range of values of the indication may be binary or more.

Referring to FIG. 8, the victim BS 800 may transmit a CLI measurement timing indication for aggressor $UE_1$ to the victim UE 810 (801). The victim BS 800 may transmit a CLI measurement timing indication for aggressor $UE_2$ to the victim UE 810 (803). The victim BS 800 may transmit a CLI measurement timing indication for aggressor $UE_N$ to the victim UE 810 (805).

When the indication has a binary value range, the indication indicates a CLI measurement timing corresponding to the transmission and reception mode of an aggressor BS, and two transmission and reception modes are available to the aggressor BS depending on whether the BS supports simultaneous DL signal transmission and UL signal reception as described before with reference to FIG. 7. For example, when a value of 0 for the indication corresponds to a case where the aggressor BS does not support simultaneous signal transmission and reception (e.g., TDD), the victim UE

810 should set a CLI measurement timing that reflects a switching delay required for the afore-described transmission and reception switching of the BS, and when a value of 1 for the indication corresponds to a case where the aggressor BS does not support simultaneous signal transmission and reception (e.g., FD), the victim UE 810 may set a CLI measurement timing that does not reflect the switching delay required for the transmission and reception switching of the BS. When the range of values for the indication is more than binary, it may be considered to set a value between the CLI measurement timings used when the range of values for the indication is binary.

Figure 9:
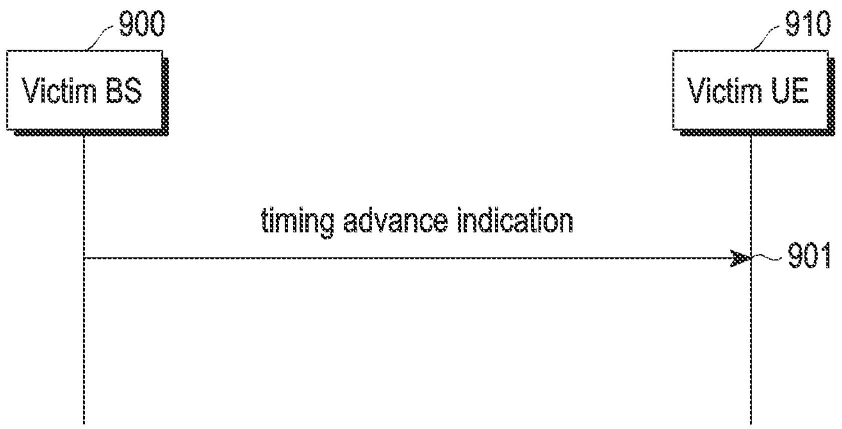
FIG. 9 is a diagram illustrating another exemplary method for indicating a timing advance to a UE by a BS according to an embodiment of the disclosure.

FIG. 9 is a diagram illustrating another exemplary method for indicating a timing advance to a UE by a BS according to an embodiment of the disclosure.

FIG. 9 illustrates that a BS indicates a single CLI measurement timing to a UE according to Method 2 of Embodiment 1 described above. In Method 2 of Embodiment 1, the UE may measure SRS-RSRP or a CLI-RSSI, and a victim BS 900 may indicate a single CLI measurement timing to a victim UE 910 by comprehensively considering the transmission and reception mode of a BS to which each aggressor UE belongs. In this case, the CLI measurement timing may be specified by the RRC, DCI, a MAC CE, or the like, and the range of values of the indication may be binary or more.

In an example of a method of indicating a CLI measurement timing to the victim UE 910 by the victim BS 900 according to Method 2 of Embodiment 1, the victim BS 900 may indicate a CLI measurement timing that may minimize a CLI measurement error at the victim UE 910 by comprehensively considering the transmission and reception modes of neighboring aggressor BSs.

For example, when the majority of the transmission and reception modes of aggressor BSs belonging to aggressor UEs adjacent to the victim UE 910 are TDD, the victim BS 900 may indicate a CLI measurement timing based on TDD, and when the majority of the transmission and reception modes of the aggressor BSs belonging to aggressor UEs adjacent to the victim UE 910 are FD, the victim BS 900 may indicate a CLI measurement timing based on FD. For example, the victim BS 900 may set a weight for at least one of the number of aggressor BSs having TDD as their transmission and reception modes or the number of aggressor BSs having FD as their transmission and reception modes, and set the CLI measurement timing to a value between a value that reflects a switching delay and a value that does not reflect a switching delay according to the weight.

While configuring a single CLI measurement timing for the victim UE 910 by the victim BS 900 as in Method 2 of Embodiment 1 may result in a higher error of CLI measurement than configuring a CLI measurement timing for each aggressor UE as in Method 1 of Embodiment 1, the former may reduce signaling overhead between the victim BS 900 and the victim UE 910.

Embodiment 2

Embodiment 2 relates to a method for transmitting information that may minimize a measurement error caused by a timing during CLI measurement to a victim BS by an aggressor BS during the CLI measurement. Information about the transmission and reception mode of the aggressor BS or information about a timing advance that an aggressor UE belonging to the aggressor BS applies to a UL signal transmission may be considered as an example of the information that the aggressor BS transmits to the victim BS.

In Embodiment 1 above, to allow the victim BS to indicate a CLI measurement timing to the victim UE according to the transmission and reception mode of the aggressor BS, the aggressor BS should transmit information about its transmission and reception mode to the victim BS in advance. In this case, it may be considered that the aggressor BS transmits the information about its transmission and reception mode to the victim BS using an X2 or Xn interface or through over the air (OTA) signaling.

The method for transmitting information about a transmission and reception mode between BSs according to Embodiment 2 of the disclosure is also applicable to other interfaces through which information may be exchanged between the BSs, other than the interface taken as an example. A transmission and reception mode indication transmitted to the victim BS by the aggressor BS may be in the form of directly indicating the transmission and reception mode of the aggressor BS or indirectly indicating the transmission and reception mode of the victim BS.

In the case of directly indicating the transmission and reception mode of the aggressor BS, the indication may be configured to have a binary value range, when the transmission and reception modes of the aggressor BS are categorized in a binary manner based on whether the aggressor BS is capable of simultaneously performing a DL signal transmission and a UL signal reception. According to an embodiment, when the transmission and reception modes of the aggressor BS are categorized into TDD, FD, frequency division duplexing (FDD), and cross division duplexing (XDD) instead of the binary classification, the indication may have a value range equal to or greater than a binary one.

In an example of indirectly indicating the transmission and reception mode of the aggressor BS, the indication may be in the form of indicating the numbers of DL symbols and UL symbols. For example, when the number of symbols in a slot is 14 and the number of DL symbols and the number of UL symbols in a slot, indicated by the indication, are both 14, this indicates that the aggressor BS is capable of simultaneously performing a DL signal transmission and a UL signal reception, and otherwise, it indicates that the aggressor BS is not capable of simultaneously performing a DL signal transmission and a UL signal reception. The disclosure is also applicable to an indication in the form of indirectly indicating the transmission and reception mode of the aggressor BS.

Figure 10:
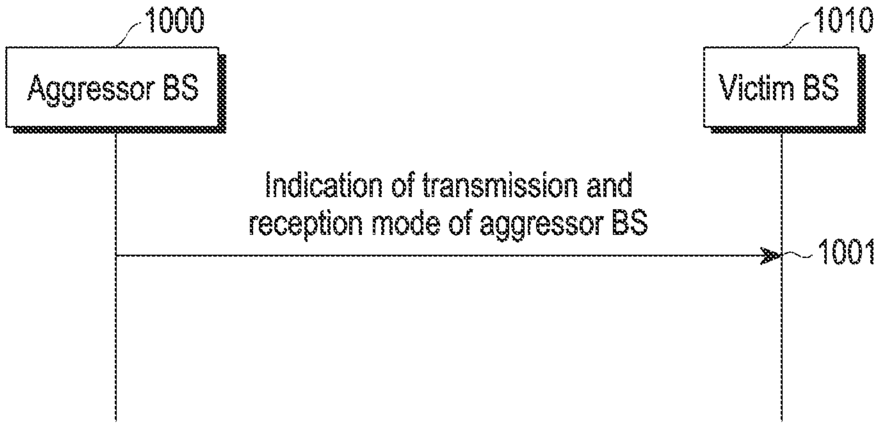
FIG. 10 is a diagram illustrating a method for indicating a transmission and reception mode between BSs according to an embodiment of the disclosure.

FIG. 10 is a diagram illustrating a method for indicating a transmission and reception mode between BSs according to an embodiment of the disclosure.

In FIG. 10, an aggressor BS 1000 may transmit BS information of the aggressor BS 1000 to a victim BS 1010.

The aggressor BS 1000 may transmit information related to its transmission and reception mode to the victim BS 1010, along with information related to a timing advance that an aggressor UE belonging to the aggressor BS 1000 applies when transmitting a UL signal.

According to an embodiment, when transmitting the UL signal, the aggressor UE may apply the timing advance by further considering a propagation delay between the aggressor UE and the aggressor BS 1000 in addition to whether to apply a switching delay based on the transmission and reception mode of the aggressor BS 1000. The aggressor BS 1000 may transmit, to the victim BS 1010, information about a final timing advance that an aggressor UE applies during a UL signal transmission, on an aggressor UE basis. According to an embodiment, the aggressor BS 1000 may transmit information about a single timing advance to the victim BS 1010 in consideration of the timing advance of each aggressor UE.

According to an embodiment, when aggressor UEs belonging to the aggressor BS 1000 apply separate timing advances during their UL signal transmissions by considering factors other than a switching delay and a propagation delay, the aggressor BS 1000 may transmit information about the separate timing advances to the victim BS 1010 to enable the victim UE to measure CLI without errors.

According to an embodiment, the aggressor BS 1000 may transmit the information about the transmission and reception mode or the information about the timing advance to the victim BS 1010 using an X2 or Xn interface or through OTA signaling. The method for transmitting the timing advance information between the aggressor BS 1000 and the victim BS 1010 according to Embodiment 2 of the disclosure may be implemented through any other interface that allows information exchange between BSs other than the above-mentioned interfaces.

According to an embodiment, the aggressor BS 1000 may transmit the timing advance information to the victim BS 1010 by directly indicating a timing advance value, or by setting multiple preset timing advance values and transmitting a corresponding indication among indications corresponding to the respective values.

Figure 11:
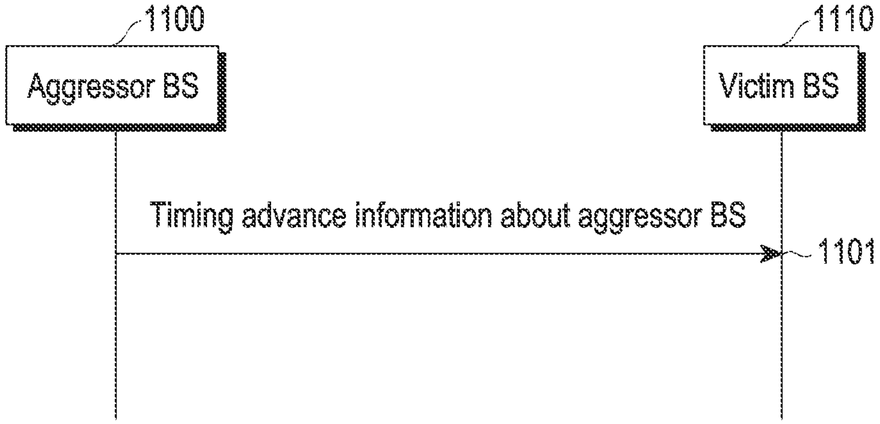
FIG. 11 is a diagram illustrating an exemplary method for indicating a timing advance between BSs according to an embodiment of the disclosure.

FIG. 11 is a diagram illustrating another exemplary method for indicating a timing advance between BSs according to an embodiment of the disclosure.

In FIG. 11, an aggressor BS 1100 may transmit single-timing advance information to a victim BS 1110, as described in Embodiment 2.

Figure 12:
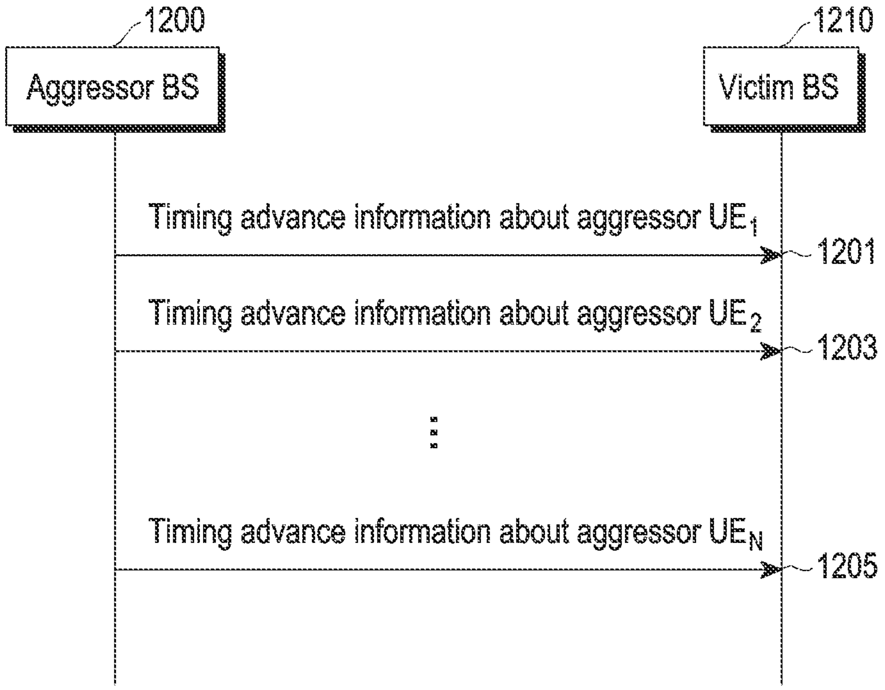
FIG. 12 is a diagram illustrating another exemplary method for indicating a timing advance between BSs according to an embodiment of the disclosure.

FIG. 12 is a diagram illustrating another exemplary method for indicating a timing advance between BSs according to an embodiment of the disclosure.

In FIG. 12, an aggressor BS 1200 may transmit timing advance information about each of aggressor UEs belonging to the aggressor BS 1200 to a victim BS 1210, as described in Embodiment 2.

The aggressor BS 1200 may transmit timing advance information about aggressor $UE_1$ to the victim BS 1210 (1201). The aggressor BS 1200 may transmit timing advance information about aggressor $UE_2$ to the victim BS 1210 (1203). The aggressor BS 1200 may transmit timing advance information about aggressor $UE_N$ to the victim BS 1210 (1205).

Embodiment 3

Embodiment 3 proposes a method for controlling CLI by restricting scheduling of a victim UE or aggressor UE or changing the transmission and reception mode of the aggressor UE, based on the value of CLI that the victim UE has measured at an indicated CLI measurement timing according to Embodiment 1 and Embodiment 2.

When an aggressor BS transmits information about its transmission and reception mode to a victim BS according to Embodiment 2, the victim BS may indicate a CLI measurement timing to a victim UE based on the information about the transmission and reception mode of the aggressor BS according to Embodiment 1. The victim UE may measure SRS-RSRP or a CLI-RSSI according to the indicated CLI measurement timing and transmit a result value to the victim BS. The victim BS may perform CLI control based on the CLI measurement result transmitted by the victim UE, specifically in the following methods.

(Embodiment 3-Method 1) Method for restricting DL signal reception of a victim UE (Embodiment 3-Method 2) Method for restricting UL signal transmission of an aggressor UE (Embodiment 3-Method 3) Method for changing the transmission and reception mode of an aggressor UE In Embodiment 3-Method 1, the victim BS may restrict DL signal reception of the victim UE, so that the victim UE does not suffer DL signal reception failure caused by CLI.

As an example of restricting DL signal reception of the victim UE according to Method 1 of Embodiment 3, the following situation may be considered: CLI has a large impact on the DL signal reception of the victim UE on the whole, and the contribution of each aggressor UE to the CLI is generally similar or a large number of aggressor UEs have a large impact on the CLI, such that restricting all of the affecting aggressor UEs from transmitting UL signals results in significant degradation of the UL performance of the overall communication system.

In Method 2 of Embodiment 3, the victim BS may transmit a request for restricting UL signal transmission of an aggressor UE that the victim BS wants to restrict to an aggressor BS to which the aggressor UE belongs, and the aggressor BS receiving the request may restrict the UL signal transmission of the aggressor UE, so that the impact of CLI that the victim UE experiences during reception of a DL signal from the victim BS is reduced, and thus the victim UE does not experience CLI-caused reception failure.

As an example of restricting UL signal transmission of an aggressor UE according to Method 2 of Embodiment 3, the following situation may be considered: CLI has a large impact on DL signal reception of a victim UE on the whole, and the contribution of a certain small number of aggressor UEs to the CLI is dominant, such that restricting UL signal transmissions of only those aggressor UEs reduces the overall impact of the CLI to the extent that the victim UE may reliably receive a DL signal, and also restricting the UL signal transmissions of those aggressor UEs does not result in significant degradation of the UL performance of the overall communication system.

In Method 3 of Embodiment 3, the victim BS may transmit a request for changing the transmission and reception mode of an aggressor UE that the victim BS wants to change to an aggressor BS to which the aggressor UE belongs, and the aggressor BS receiving the request may change the transmission and reception mode of the aggressor UE, thereby reducing the impact of CLI that the victim UE experiences during reception of a DL signal from the victim BS and thus allowing the victim UE not to experience CLI-caused reception failure.

An example of reducing the impact of CLI by changing the transmission and reception mode of an aggressor UE as in Method 3 of Embodiment 3 may be a case where when the transmission mode of the aggressor UE, which operates in FD and thus transmits a UL signal to an aggressor BS in each slot, is changed to TDD, the aggressor UE may transmit a UL signal only in a period configured with UL slots without transmitting the UL signal in each slot, thereby reducing the impact of CLI that the victim UE experiences due to the UL signal transmission of the aggressor UE.

Changing the transmission and reception mode of the aggressor UE in Method 3 of Embodiment 3 allows the aggressor UE to experience a smaller UL signal transmission loss for CLI control, despite a smaller effect of controlling the impact of CLI from the aggressor UE, than restricting UL signal transmission of the aggressor UE in Method 2 of Embodiment 3.

As an example of changing the transmission and reception mode of the aggressor UE in Method 3 of Embodiment 3, the following situation may be considered: CLI has a large impact on DL signal reception of the victim UE, and the contribution of a certain small number of aggressor UEs is dominant, such that changing only the transmission and reception modes of the aggressor UEs reduces the overall impact of the CLI to the extent that the victim UE may stably receive a DL signal, and does not significantly degrade the UL performance of the overall communication system.

Figure 13:
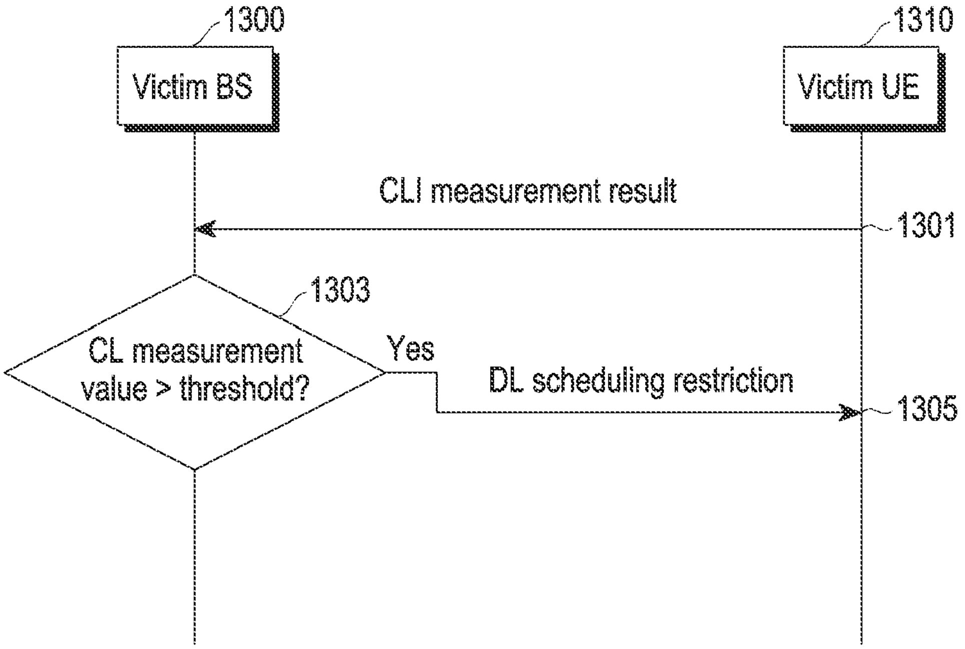
FIG. 13 is a diagram illustrating an exemplary method for controlling CLI through scheduling restriction according to an embodiment of the disclosure.

FIG. 13 is a diagram illustrating an exemplary method for controlling CLI through scheduling restriction according to an embodiment of the disclosure.

In FIG. 13, according to Method 1 of Embodiment 3, a victim BS 1300 may restrict DL signal reception of a victim UE 1310.

The victim BS 1300 may receive a CLI measurement result value from the victim UE 1310 (1301). The victim BS 1300 may determine whether the CLI measurement result value is greater than a set threshold (1303). When the CLI measurement result value is greater than the threshold, the victim BS 1300 may restrict DL signal reception of the victim UE 1310 by transmitting a DL scheduling restriction message to the victim UE 1310 (1305).

Figure 14:
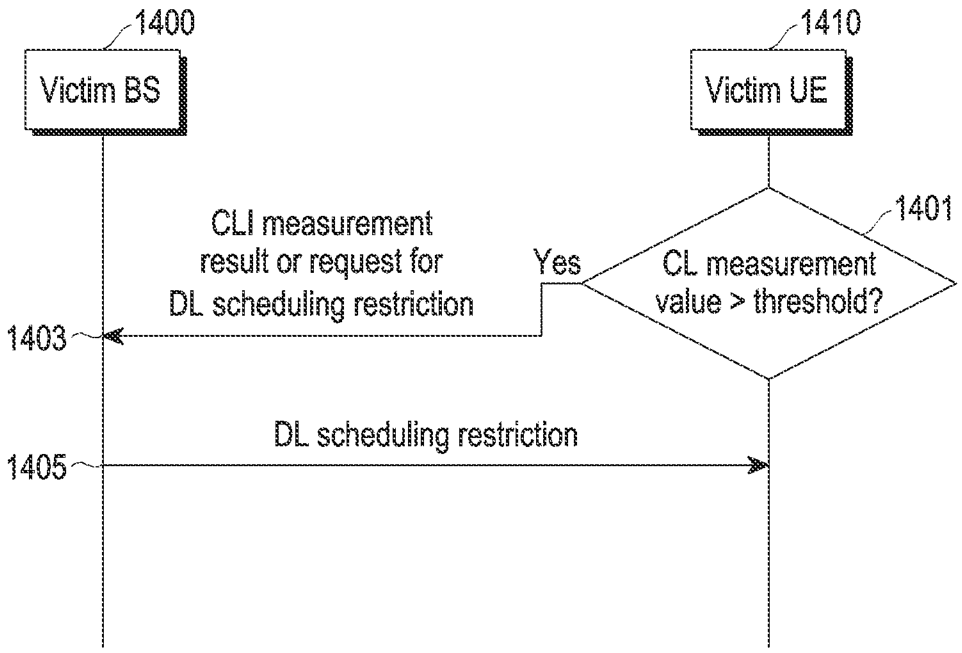
FIG. 14 is a diagram illustrating another exemplary method for controlling CLI through scheduling restriction according to an embodiment of the disclosure.

FIG. 14 is a diagram illustrating another exemplary method for controlling CLI through scheduling restriction according to an embodiment of the disclosure.

In FIG. 14, according to Method 1 of Embodiment 3, a victim BS 1400 may restrict DL signal reception of a victim UE 1410.

In FIG. 13, when a CLI measurement result value received from the victim UE 1310 by the victim BS 1300 is greater than the threshold set by the victim BS 1300, the victim BS 1300 may restrict DL signal reception of the victim UE 1310. In contrast, in FIG. 14, when the victim UE 1410 transmits a CLI measurement result value to the victim BS 1400, the victim UE 1410 may apply a threshold on its own and transmit only a CLI measurement result value greater than the threshold to the victim BS 1400. Alternatively, when the CLI measurement result value is greater than the threshold set by the victim UE 1410, the victim UE 1410 may transmit a request for the purpose of restricting DL signal reception to the victim BS 1400.

The victim UE 1410 may determine whether the CLI measurement value is greater than the threshold (1401). When the CLI measurement value is greater than the threshold according to a result of the determination, the victim UE 1410 may transmit the CLI measurement value greater than the threshold to the victim BS 1400 or transmit a message requesting DL scheduling restriction to the victim BS 1400 (1403). The victim BS 1400 may transmit a message restricting DL scheduling of the victim UE 1410 to the victim UE 1410 (1405).

According to an embodiment, when the victim UE 1410 transmits only a CLI measurement result value greater than the threshold on its own to the victim BS 1400, signaling overhead caused by transmission of CLI measurement results between the victim BS 1400 and the victim UE 1410 may be reduced.

According to another embodiment, when the victim UE 1410 transmits a request for the purpose of restricting DL signal reception instead of a CLI measurement result to the victim BS 1400, signaling overhead in the victim BS 1400 may be further reduced, and a procedure of interpreting and determining a CLI measurement result in the victim BS 1400 may be skipped.

Figure 15:
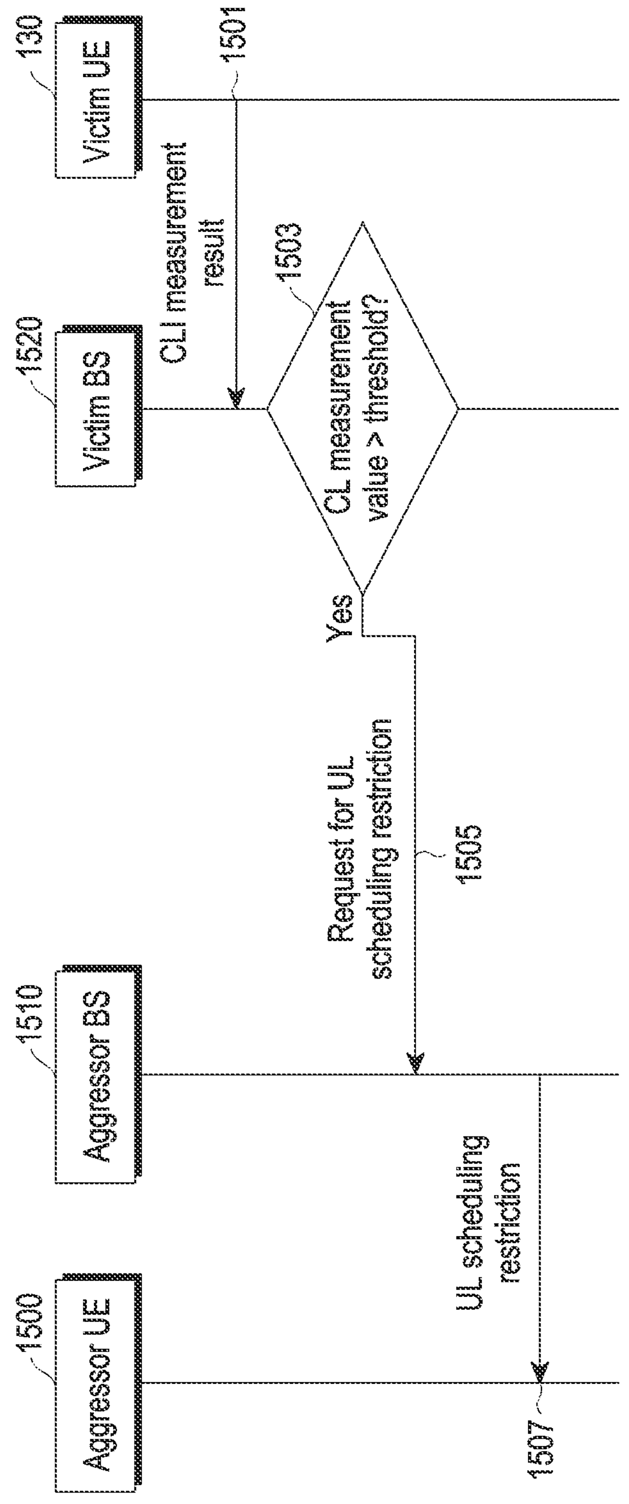
FIG. 15 is a diagram illustrating another exemplary method for controlling CLI through scheduling restriction according to an embodiment of the disclosure.

FIG. 15 is a diagram illustrating another exemplary method for controlling CLI through scheduling restriction according to an embodiment of the disclosure.

FIG. 15 illustrates a method in which according to Method 2 of Embodiment 3, a victim BS 2020 transmits a request for restricting UL signal transmission of a specific aggressor UE 1500 to an aggressor BS 2010 to which the aggressor UE 1500 belongs, and the aggressor BS 2010 receiving the request restricts the UL signal transmission of the aggressor UE 1500 according to the request.

A victim UE 2030 may transmit a CLI measurement result value to the victim BS 2020 (1501). The victim BS 2020 may determine whether the CLI measurement result value for the specific aggressor UE 1500 received from the victim UE 2030 is greater than a threshold set by the victim BS 2020 (1503).

When the CLI measurement result value for the specific aggressor UE 1500 is greater than the threshold, the victim BS 2020 may transmit a request for restricting UL signal transmission of the aggressor UE 1500 to the aggressor BS 2010 to which the aggressor UE 1500 belongs (1505).

The aggressor BS 2010, which has received the request for restricting UL signal transmission from the victim BS 2020, may transmit a message restricting the UL signal transmission of the aggressor UE 1500 to the aggressor UE 1500 according to the request (1507).

For SRS-RSRP measurement, when multiple individual aggressor UEs transmit different SRSs, UL signal transmission may be restricted on an aggressor UE basis. However, when multiple aggressor UEs belong to specific groups and transmit the same SRSs on a group basis, UL signal transmission may be restricted on an aggressor UE group basis.

In addition, for CLI-RSSI measurement, when frequency bands in which individual aggressor UEs or aggressor UE groups transmit UL signals do not overlap, and thus CLI-RSSI measurement results may be distinguished on an aggressor UE basis or on an aggressor UE group basis, UL signal transmission may be restricted on an aggressor UE basis or on an aggressor UE group basis, as is done for SRS-RSP measurement.

Figure 16:
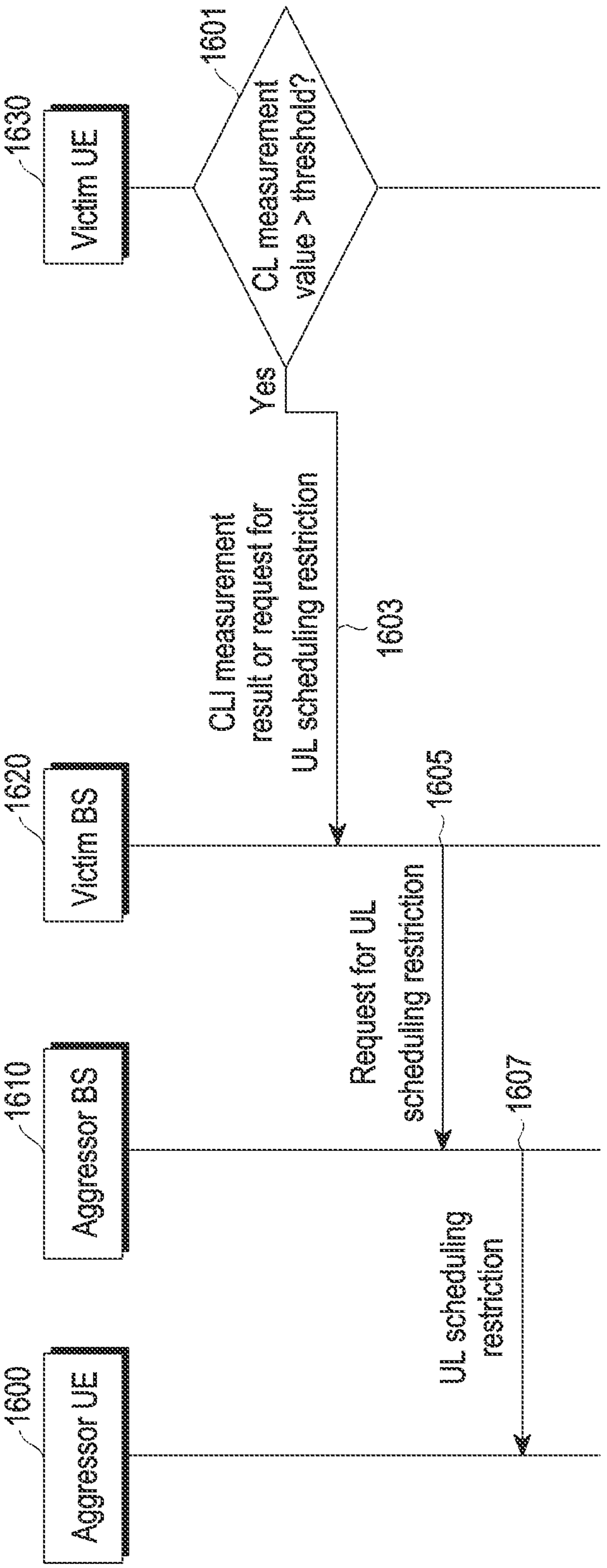
FIG. 16 is a diagram illustrating another exemplary method for controlling CLI through scheduling restriction according to an embodiment of the disclosure.

FIG. 16 is a diagram illustrating another exemplary method for controlling CLI through scheduling restriction according to an embodiment of the disclosure.

In FIG. 16, according to Method 2 of Embodiment 3, a victim BS 1620 transmits, to an aggressor BS 1610, a request for restricting UL signal transmission of a specific aggressor UE 1600 belonging to the aggressor BS 1610, and the aggressor BS 1610 receiving the request may restrict the UL signal transmission of the aggressor UE 1600 according to the request.

Unlike FIG. 15, in FIG. 16, when a victim UE 1630 transmits a CLI measurement result value for the specific aggressor UE 1600 to the victim BS 1620, the victim UE 1630 may apply a threshold on its own.

When the CLI measurement result is greater than the threshold set by the victim UE 1630, the victim UE 1630 may transmit the CLI measurement result value greater than the threshold to the victim BS 1620 or transmit a request for restricting UL signal transmission of the aggressor UE 1600 to the victim BS 1620 (1603).

When the victim UE 1630 transmits only a CLI measurement result greater than the threshold to the victim BS 1620 on its own, signaling overhead caused by transmission of CLI measurement results between the victim BS 1620 and the victim UE 1630 may be reduced. Further, when the victim UE 1630 transmits a request for restricting UL signal transmission of the aggressor UE 1600, instead of a CLI measurement result for the specific aggressor UE 1600, to the victim BS 1620, the signaling overhead in the victim BS 1620 may be further reduced, and a procedure of interpreting and determining a CLI measurement result in the victim BS 1620 may be skipped.

Because unlike the victim BS 1620, the victim UE 1630 does not exchange information with the aggressor BS 1610 for CLI measurement, a process of identifying the aggressor UE 1600 for which the request for restricting UL signal transmission has been transmitted by the victim UE 1630 should be performed in the victim BS 1620.

The victim BS 1620, which has identified the aggressor UE 1600 to be subjected to UL signal transmission restriction, may transmit a request for restricting the UL signal transmission of the aggressor UE 1600 to the aggressor BS 1610 to which the aggressor UE 1600 belongs (1605).

The aggressor BS 1610 that has received the request may transmit a message restricting the UL signal transmission of the aggressor UE 1600 to the aggressor UE 1600 according to the request (1607). According to an embodiment, UL signal transmission may be restricted on an aggressor UE basis or on an aggressor UE group basis during SRS-RSP or CLI-RSSI measurement.

Figure 17:
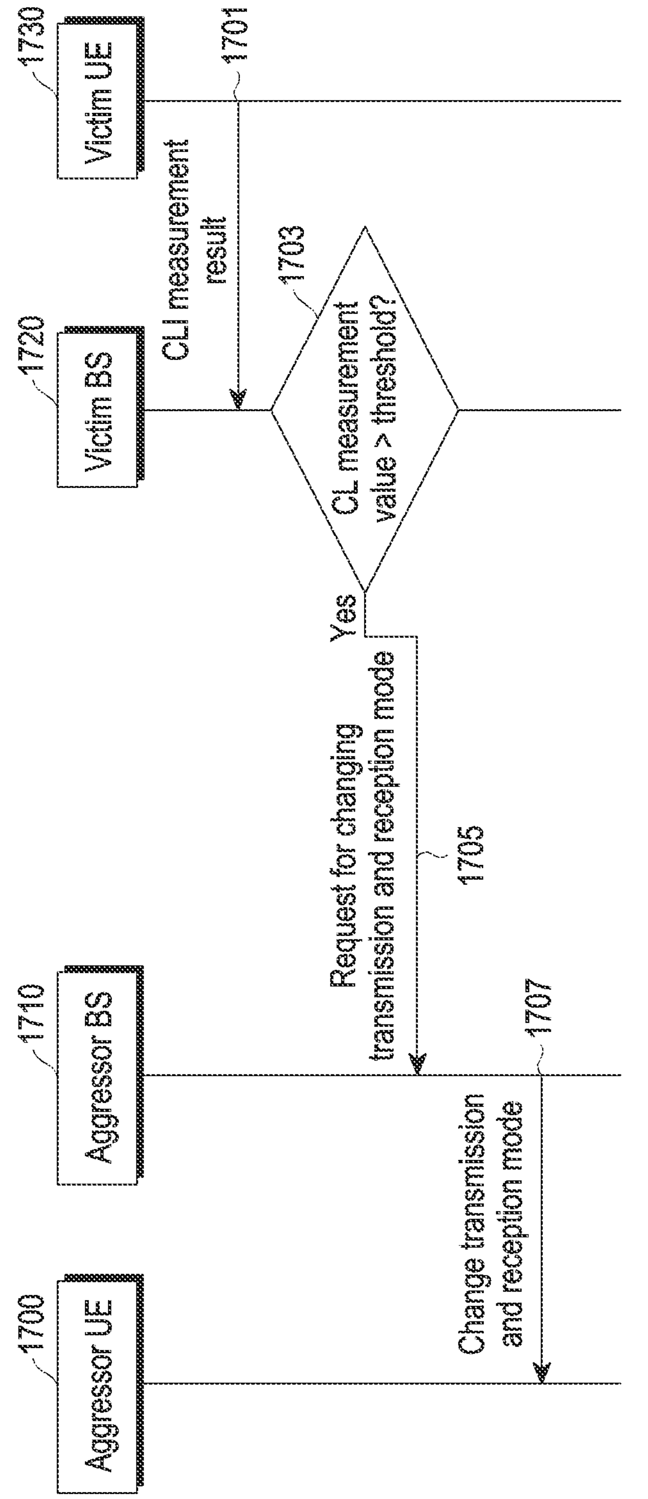
FIG. 17 is a diagram illustrating another exemplary method for controlling CLI through scheduling restriction according to an embodiment of the disclosure.

FIG. 17 is a diagram illustrating another exemplary method for controlling CLI through scheduling restriction according to an embodiment of the disclosure.

FIG. 17 illustrates a method in which according to Method 3 of Embodiment 3, a victim BS 1720 transmits a request for changing the transmission and reception mode of a specific aggressor UE 1700 to an aggressor BS 1710 to which the aggressor UE 1700 belongs, and the aggressor BS 1710 receiving the request changes the transmission and reception mode of the aggressor UE 1700 according to the request.

A victim UE 1730 may transmit a CLI measurement result value to the victim BS 1720 (1701). The victim BS 1720 may determine whether the CLI measurement result value for the specific aggressor UE 1700 received from the victim UE 1730 is greater than a threshold set by the victim BS 1720 (1703).

When the CLI measurement result value for the specific aggressor UE 1700 is greater than the threshold set by the victim BS 1720, the victim BS 1720 may transmit a request for changing the transmission and reception mode of the aggressor UE 1700 to the aggressor BS 1710 to which the aggressor UE 1700 belongs (1705).

The aggressor BS 1710, which has received the transmission and reception mode change request transmitted by the victim BS 1720, may transmit a message to change the transmission and reception mode of the aggressor UE 1700 to the aggressor UE 1700 according to the request (1707).

For SRS-RSRP measurement, when multiple aggressor UEs individually transmit different SRSs, the transmission and reception mode may be changed on an aggressor UE basis. However, when multiple aggressor UEs belong to specific groups and transmit the same SRSs on a group basis, the transmission and reception mode may be changed on an aggressor UE group basis.

In addition, for CLI-RSSI measurement, when frequency bands in which individual aggressor UEs or aggressor UE groups transmit UL signals do not overlap, and thus CLI-RSSI measurement results may be distinguished on an aggressor UE basis or on an aggressor UE group basis, the transmission and reception mode may be changed on an aggressor UE basis or on an aggressor UE group basis, as is done for SRS-RSP measurement.

Figure 18:
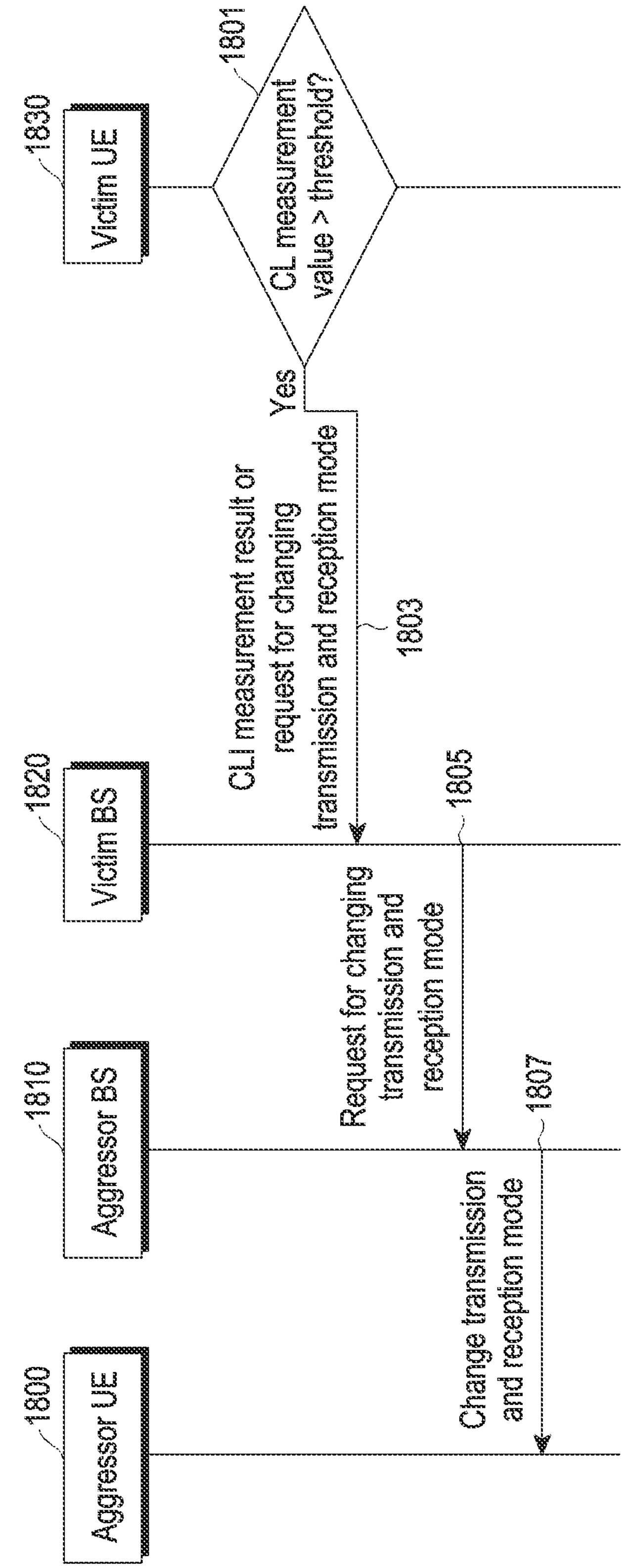
FIG. 18 is a diagram illustrating another exemplary method for controlling CLI through scheduling restriction according to an embodiment of the disclosure.

FIG. 18 is a diagram illustrating another exemplary method for controlling CLI through scheduling restriction according to an embodiment of the disclosure.

FIG. 18 illustrates a method in which according to Method 3 of Embodiment 3, a victim BS 1820 transmits a request for changing the transmission and reception mode of a specific aggressor UE 1800 to an aggressor BS 1810 to which the aggressor UE 1800 belongs, and the aggressor BS 1810 receiving the request changes the transmission and reception mode of the aggressor UE 1800 according to the request.

Unlike FIG. 17, when the victim UE 1830 transmits a CLI measurement result value for the specific aggressor UE 1800 to the victim BS 1820, the victim UE 1830 may apply a threshold on its own in FIG. 18.

The victim UE 1830 may determine whether the CLI measurement result value for the specific aggressor UE 1800 is greater than the threshold (1801). When the CLI measurement result value for the specific aggressor UE 1800 is greater than the threshold, the victim UE 1830 may transmit the CLI measurement result value greater than the threshold to the victim BS 1820 or transmit a request for changing the transmission and reception mode of the aggressor UE 1800 to the victim BS 1820 (1803).

When the victim UE 1830 transmits only a CLI measurement result value greater than the threshold to the victim BS 1820 on its own, signaling overhead caused by transmission of CLI measurement results between the victim BS 1820 and the victim UE 1830 may be reduced.

Further, when the victim UE 1830 transmits a request for changing the transmission and reception mode of the aggressor UE 1800, instead of the CLI measurement result for the specific aggressor UE 1800, to the victim BS 1820, the signaling overhead in the victim BS 1820 may be further reduced, and a procedure of interpreting and determining a CLI measurement result in the victim BS 1820 may be skipped.

Because unlike the victim BS 1820, the victim UE 1830 does not exchange information with the aggressor BS 1810 for CLI measurement, a process of identifying the aggressor UE 1800 for which the request for changing the transmission and reception mode has been transmitted by the victim UE 1830 should be performed in the victim BS 1820.

The victim BS 1820, which has identified the aggressor UE 1800 whose the transmission and reception mode is to be changed, may transmit a request for changing the transmission and reception mode of the aggressor UE 1800 to the aggressor BS 1810 to which the aggressor UE 1800 belongs (1805).

The aggressor BS 1810 that has received the request may transmit a message to change the transmission and reception mode of the aggressor UE 1800 to the aggressor UE 1800 according to the request (1807). According to an embodiment, the transmission and reception mode may be changed on an aggressor UE basis or on an aggressor UE group basis during SRS-RSP or CLI-RSSI measurement.

Embodiment 4

Embodiment 4 proposes a method for reducing a CLI measurement error by increasing the number of SRS symbols transmitted from an aggressor UE and changing the SRS, when a BS does not indicate a CLI measurement timing to a UE according to the above-described Embodiment 1 and Embodiment 2.

When the BS does not indicate a CLI measurement timing to the UE according to Embodiment 1 and Embodiment 2, the victim UE may set a CLI measurement timing that reflects a switching delay, when neighboring aggressor BSs are in TDD, during CLI measurement. When CLI is measured at a single timing in accordance with TDD, the CLI may be measured without errors when the transmission and reception modes of the neighboring BSs are TDD (703), as described above with reference to FIG. 7. On the contrary, when the neighboring BSs are in FD, measurement error may occur (704).

When the transmission and reception mode of a neighboring cell is FD, a timing at which the victim UE detects an SRS for CLI measurement may be earlier than a timing at which an SRS transmitted from an aggressor UE arrives at the victim UE. When the number of SRS symbols transmitted by the aggressor UE is 1 and the length of a detection window in which the victim UE detects the SRS is one symbol including a CP, the SRS transmitted by the aggressor UE is not included fully within the detection window of the victim UE due to the above-described timing error, thereby resulting in a CLI measurement error.

To solve the problem of a CLI measurement error, the length of the detection window of the victim UE may be extended to two symbols each including a CP, and the number of SRS symbols transmitted by the aggressor UE may be maintained to be 1. In this case, although the SRS is fully included in the detection window of the victim UE, the victim UE may not determine the starting and ending time positions of the SRS in the detection window, and thus a CLI measurement error may also occur.

Figure 19:
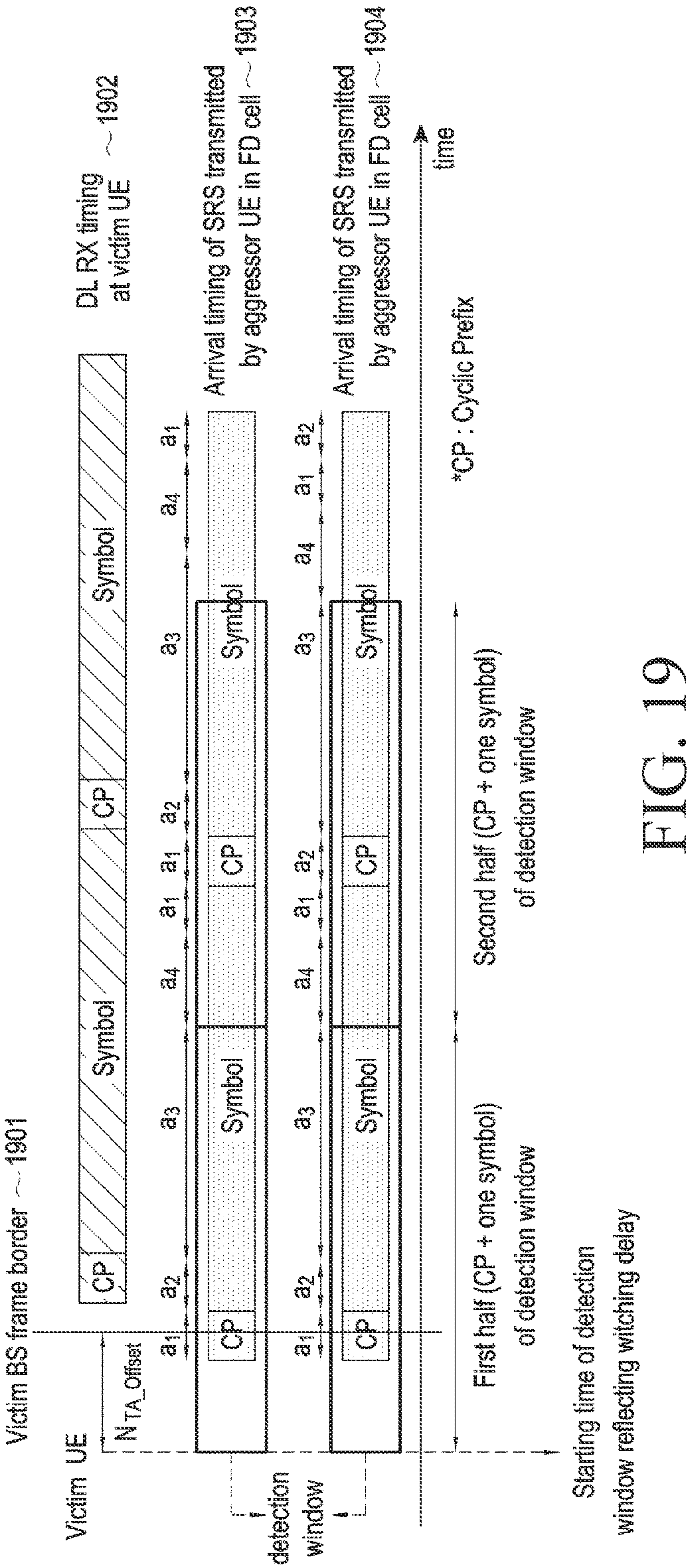
FIG. 19 is a diagram illustrating a method for measuring CLI when a BS does not indicate a timing to a UE according to an embodiment of the disclosure.

FIG. 19 is a diagram illustrating a method for measuring CLI, when a BS does not indicate a timing to a UE according to an embodiment of the disclosure.

In FIG. 19, reference numerals 1901 and 1902 denote a frame reference line of a victim BS and a timing at which a DL signal transmitted from the victim BS arrives at a victim UE after being delayed as much as a propagation delay, respectively, like reference numerals 701 and 702 in FIG. 7.

Reference numeral 1903 denotes both a timing in the case where the victim UE sets the starting point of the detection window by reflecting a switching delay of a TDD BS and sets the length of the detection window to two symbols each including a CP, and a timing at which the same SRS transmitted in two consecutive symbols by the aggressor UE arrives at the victim UE.

As described before with reference to FIG. 7, because the transmission and reception mode of the aggressor BS to which the aggressor UE belongs is FD, the aggressor UE transmits an SRS without reflecting the switching delay in a timing advance. Accordingly, the SRS may arrive at the victim UE later than the starting time of the detection window of the victim UE in which the switching delay is reflected.

Since the detection window of the victim UE spans two symbols, it may be divided into one symbol in a first half and one symbol in a second half. A first SRS symbol transmitted by the aggressor UE may be divided into a CP part $a_1$, a part $a_2$ of the length of the CP immediately after the end of the CP, a part $a_3$ spanning to the first half of the detection window, following the part $a_2$, a part $a_4$ spanning to a point ahead of the end of the first SRS symbol by the CP length, after the part $a_3$, and the part $a_1$ spanning to the end of the first SRS symbol, after the part $a_4$.

Due to the characteristics of the CP, the same signal part $a_1$ as the CP part lasts until the end of the first SRS symbol after the part $a_4$, and the parts included in the first half of the detection window are $a_1$, $a_2$, and $a_3$. Since the second SRS symbol transmitted by the aggressor UE is the same as the first SRS symbol, it may be divided into $a_1$, $a_2$, $a_3$, $a_4$, and $a_1$ in time order.

To enable the victim UE to measure CLI without an error, the signal parts $a_1$, $a_2$, $a_3$, and $a_4$ should be included in the first or second half of the detection window. When the signal parts $a_1$, $a_2$, $a_3$, and $a_4$ are included across the first and second halves of the detection window, the victim UE may not determine the starting and ending time positions of the signal parts in the detection window, and thus a CLI measurement error also occurs.

As a consequence, in reference numeral 1903, the SRS is not fully included in the detection window of the victim UE, resulting in an error during CLI measurement.

Reference numeral 1904 differs from reference numeral 1903 in the second SRS transmitted by the aggressor UE, and is the same as reference numeral 1903 in the starting time and length of the detection window set by the victim UE and the first SRS symbol transmitted by the aggressor UE.

Compared to reference numeral 1903 in which the second SRS symbol transmitted by the aggressor UE is configured to be the same as the first SRS symbol, the second symbol may be configured by applying a cyclic shift of the CP length to the part of the first SRS symbol except for the CP on the time axis in reference number 1904.

Specifically, the part of the first SRS symbol excluding the CP is $a_2$, $a_3$, $a_4$, and $a_1$ in this order, and the result of applying the cyclic shift to the left on the time axis by the length of CP is $a_3$, $a_4$, $a_1$, and $a_2$. Because the CP is a copy of an end part of the signal and forms the beginning of the signal, the second SRS including the CP is $a_3$, $a_4$, $a_1$, and $a_2$.

As described before, to enable the victim UE to measure CLI without an error, the first or second half of the detection window should include all signal parts $a_1$, $a_2$, $a_3$, and $a_4$, and when a cyclic shift is applied as described above, it may be seen from reference numeral 1904 that the signal parts $a_1$, $a_2$, $a_3$, and $a_4$ are all included in the second half of the detection window.

The signal part is in the order of $a_4$, $a_1$, $a_2$, and $a_3$, which is different from the first or second SRS. However, since the victim UE measures the RSRP of the SRS, the different time order of the signal part causes no measurement error.

In summary, when the aggressor UE transmits an SRS of two symbols and applies a cyclic shift to the second SRS symbol on the time axis as indicated by reference numeral 1904, CLI may be measured without a measurement error, even if the victim BS does not indicate a separate CLI measurement timing to the victim UE. Although the signaling overhead between the victim BS and the victim UE or between BSs is reduced, signal processing overhead increases due to the SRS transmission overhead and cyclic shift application of the aggressor UE.

According to an embodiment, the aggressor UE may transmit an SRS of multiple symbols to the victim UE, for CLI measurement at the victim UE.

According to an embodiment, the aggressor UE may transmit an SRS of two symbols to the victim UE. The second SRS symbol of the two-symbol SRS may be composed of a signal obtained by applying a cyclic shift to the first SRS symbol on the time axis.

According to an embodiment, when the victim UE measures CLI, the length of a time period (detection window) for detecting the SRS may be set to the signal length of the two symbols, the period may be divided into the first half and the second half of the same length, and RSRP may be measured only in a measurement period of the second half.

Figure 20:
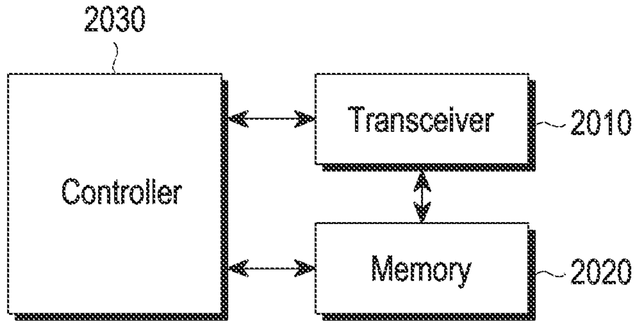
FIG. 20 illustrates the structure of a BS according to an embodiment of the disclosure.

FIG. 20 illustrates the structure of a BS according to an embodiment of the disclosure.

Each of the BS, the victim BS, and the aggressor BS described with reference to FIGS. 1 to 19 may correspond to the BS of FIG. 20. Referring to FIG. 20, the BS may include a transceiver 2010, memory 2020, and a controller 2030.

According to the afore-described communication methods of the BS, the transceiver 2010, the controller 2030, and the memory 2020 of the BS may operate. However, the components of the BS are not limited to the above example. For example, the BS may include more or fewer components than the components described above. In addition, the transceiver 2010, the controller 2030, and the memory 2020 may be implemented in the form of a single chip. Further, the controller 2030 may include one or more processors.

The transceiver 2010 collectively refers to a receiver of the BS and a transmitter of the BS, and may transmit and receive signals to and from other devices. To this end, the transceiver 2010 may include an RF transmitter that up-converts and amplifies the frequency of a transmission signal, and an RF receiver that low-noise-amplifies a received signal and down-converts the frequency of the amplified signal. However, this is only an example of the transceiver 2010, and the components of the transceiver 2010 are not limited to the RF transmitter and the RF receiver.

Further, the transceiver 2010 may receive a signal through a wireless channel and output the signal to the controller 2030, and transmit a signal output from the controller 2030 through a wireless channel.

The memory 2020 may store a program and data necessary for the operation of the BS. Further, the memory 2020 may store control information or data included in a signal obtained by the BS. The memory 2020 may include a storage medium such as ROM, RAM, hard disk, CD-ROM, and DVD, or a combination of the storage media. Further, the memory 2020 may be included in the controller 2030, not separately from the controller 2030.

The controller 2030 may control a series of processes so that the BS may operate according to the above-described embodiments of the disclosure.

For convenience of description, the victim BS, the aggressor BS, the victim UE, and the aggressor UE, which have been described with reference to FIGS. 6 to 19, may be referred to as a first BS, a second BS, a first UE, and a second UE, respectively in the disclosure.

The first BS for controlling interference signal measurement of the first UE in a wireless communication system according to an embodiment of the disclosure may receive information about a transmission and reception mode of the second BS from the second BS. The first BS may determine timing information used when the first UE measures an interference signal generated by a UL signal of the second UE communicating with the second BS, based on the information about the transmission and reception mode of the second BS. The first BS may transmit the timing information to the first UE to enable the first UE to measure the interference signal.

According to an embodiment, when an interference signal for the first UE is generated by a UL signal of a third UE, the first BS may determine the timing information indicating the same measurement timing to enable the first UE to use the same measurement timing to measure the interference signal from the second UE and the interference signal from the third UE.

According to an embodiment, when an interference signal for the first UE is generated by a UL signal of a third UE, the first BS may determine the timing information instructing the first UE to use a first measurement timing to measure the interference signal from the second UE and use a second measurement timing to measure the interference signal from the third UE.

According to an embodiment, the transmission and reception mode of the second BS may be any one of time division duplex (TDD), in-band full duplex (FD), frequency division duplex (FDD), and cross division duplex (XDD).

According to an embodiment, the first BS may transmit information about a transmission and reception mode of the first BS to the second BS periodically or aperiodically.

According to an embodiment, the first BS may receive timing advance information for at least one UE belonging to the second BS from the second BS. According to an embodiment, the first BS may transmit timing advance information for at least one UE belonging to the first BS to the second BS.

According to an embodiment, the first BS may receive a measurement value of the interference signal generated by the UL signal of the second UE from the first UE. According to an embodiment, the first BS may compare the measurement value of the interference signal with a threshold, and when the measurement value of the interference signal is greater than the threshold according to a result of the comparison, transmit a message restricting DL scheduling of the first UE to the first UE.

According to an embodiment, the BS may receive a measurement value of the interference signal greater than a threshold from the first UE. According to an embodiment, the first BS may transmit a message restricting DL scheduling of the first UE to the first UE.

According to an embodiment, when a measurement value of the interference signal of the first UE is greater than a threshold, the first BS may receive a message requesting restriction of downlink scheduling of the first UE from the first UE. According to an embodiment, the first BS may transmit a message restricting the DL scheduling of the first UE to the first UE.

According to an embodiment, when a measurement value of the interference signal of the first UE is greater than a threshold, the first BS may transmit a message requesting restriction of UL scheduling of the second UE to the second BS.

According to an embodiment, when a measurement value of the interference signal of the first UE is greater than a threshold, the first BS may transmit a message requesting changing of a transmission and reception mode to the second BS.

Figure 21:
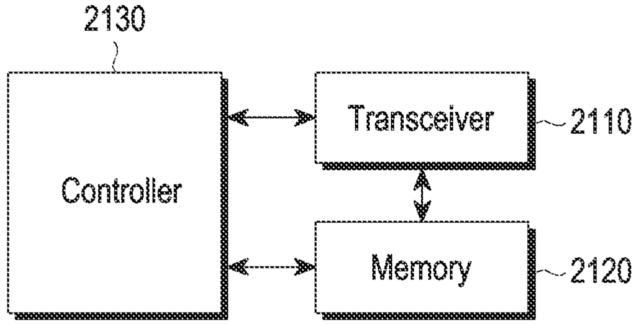
FIG. 21 illustrates the structure of a UE according to an embodiment of the disclosure.

FIG. 21 illustrates the structure of a UE according to an embodiment of the disclosure.

Each of the UE, the victim UE, and the aggressor UE described with reference to FIGS. 1 to 19 may correspond to the UE of FIG. 21. Referring to FIG. 21, the UE may include a transceiver 2110, memory 2120, and a controller 2130.

According to the afore-described communication methods of the UE, the transceiver 2110, the controller 2130, and the memory 2120 of the UE may operate. However, the components of the UE are not limited to the above example. For example, the UE may include more or fewer components than the components described above. In addition, the transceiver 2110, the controller 2130, and the memory 2120 may be implemented in the form of a single chip. Further, the controller 2130 may include one or more processors.

The transceiver 2110 collectively refers to a receiver of the UE and a transmitter of the UE, and may transmit and receive signals to and from other devices. To this end, the transceiver 2110 may include an RF transmitter that up-converts and amplifies the frequency of a transmission signal, and an RF receiver that low-noise-amplifies a received signal and down-converts the frequency of the amplified signal. However, this is only an example of the transceiver 2110, and the components of the transceiver 2110 are not limited to the RF transmitter and the RF receiver.

Further, the transceiver 2110 may receive a signal through a wireless channel and output the signal to the controller 2130, and transmit a signal output from the controller 2130 through a wireless channel.

The memory 2120 may store a program and data necessary for the operation of the UE. Further, the memory 2120 may store control information or data included in a signal obtained by the UE. The memory 2120 may include a storage medium such as ROM, RAM, hard disk, CD-ROM, and DVD, or a combination of the storage media. Further, the memory 2120 may be included in the controller 2130, not separately from the controller 2130.

The controller 2130 may control a series of processes so that the UE may operate according to the above-described embodiments of the disclosure.

For convenience of description, the victim BS, the aggressor BS, the victim UE, and the aggressor UE, which have been described with reference to FIGS. 6 to 19, may be referred to as a first BS, a second BS, a first UE, and a second UE, respectively in the disclosure.

The first UE for measuring an interference signal in a wireless communication system according to an embodiment of the disclosure may receive timing information for measuring an interference signal generated by a UL signal of the second UE communicating with the second BS from the first BS. According to an embodiment, the first UE may measure the interference signal generated by the UL signal of the second UE, based on the timing information. The timing information may be determined based on a transmission and reception mode of the second BS.

According to an embodiment, the transmission and reception mode of the second BS may be any one of TDD, in-band FD, FDD, and XDD.

According to an embodiment, the first UE may transmit a measurement value of the interference signal generated by the UL signal of the second UE to the first BS. According to an embodiment, when the measurement value of the interference signal is greater than a threshold, the first UE may receive a message restricting DL scheduling of the first UE from the first BS.

According to an embodiment, the first UE may compare a measurement value of the interference signal generated by the UL signal of the second UE with a threshold. According to an embodiment, the first UE may transmit a measurement value of the interference signal greater than the threshold to the first BS. According to an embodiment, the first UE may receive a message restricting DL scheduling of the first UE from the first BS.

According to an embodiment, when a measurement value of the interference signal of the first UE is greater than a threshold, the first UE may transmit a message requesting restriction of DL scheduling of the first UE to the first BS. According to an embodiment, the first UE may receive a message restricting the DL scheduling of the first UE from the first BS.

In the specific embodiments of the disclosure described above, components included in the disclosure are expressed in singular or plural forms according to the presented specific embodiments. However, the singular or plural expressions are selected to suit a presented situation for convenience of description. The disclosure is not limited to singular or plural components, and even components expressed in plural may be singular. Even a component expressed in singular may include plural elements.

While specific embodiments have been described in the detailed description of the disclosure, various modifications are possible without departing from the scope of the disclosure. Therefore, the scope of the disclosure should not be limited to the described embodiments, but should be determined by the scope of the appended claims and their equivalents.

The invention claimed is:

1. A method for operating a first base station (BS) for controlling interference signal measurement of a first user equipment (UE) in a wireless communication system, the method comprising:

receiving, from a second BS, information about a transmission and reception mode of the second BS;

based on the information about the transmission and reception mode of the second BS, determining timing information used when the first UE measures an interference signal generated by an uplink signal of a second UE communicating with the second BS; and transmitting, to the first UE, the timing information to enable the first UE to measure the interference signal.

2. The method of claim 1, wherein determining the timing information further comprises, when an interference signal for the first UE is generated by an uplink signal of a third UE, determining the timing information indicating the same measurement timing to enable the first UE to use the same measurement timing to measure the interference signal from the second UE and the interference signal from the third UE.

3. The method of claim 1, wherein determining the timing information further comprises, when an interference signal for the first UE is generated by an uplink signal of a third UE, determining the timing information instructing the first UE to use a first measurement timing to measure the interference signal from the second UE and use a second measurement timing to measure the interference signal from the third UE.

4. The method of claim 1, wherein the transmission and reception mode of the second BS is any one of time division duplex (TDD), in-band full duplex (FD), frequency division duplex (FDD), and cross division duplex (XDD).

5. The method of claim 1, further comprising transmitting information about a transmission and reception mode of the first BS to the second BS periodically or aperiodically.

6. The method of claim 1, further comprising:

receiving, from the second BS, timing advance information for at least one UE belonging to the second BS; and transmitting, to the second BS, timing advance information for at least one UE belonging to the first BS.

7. The method of claim 1, further comprising:

receiving, from the first UE, a measurement value of the interference signal generated by the uplink signal of the second UE;

comparing the measurement value of the interference signal with a threshold; and when the measurement value of the interference signal is greater than the threshold according to a result of the comparison, transmitting, to the first UE, a message restricting downlink scheduling of the first UE.

8. The method of claim 1, further comprising:

receiving, from the first UE, a measurement value of the interference signal greater than a threshold; and transmitting, to the first UE, a message restricting downlink scheduling of the first UE.

9. The method of claim 1, further comprising:

when a measurement value of the interference signal of the first UE is greater than a threshold, receiving, from the first UE, a message requesting restriction of downlink scheduling of the first UE; and transmitting, to the first UE, a message restricting the downlink scheduling of the first UE.

10. The method of claim 1, further comprising, when a measurement value of the interference signal of the first UE is greater than a threshold, transmitting, to the second BS, a message requesting restriction of uplink scheduling of the second UE.

11. The method of claim 1, further comprising, when a measurement value of the interference signal of the first UE is greater than a threshold, transmitting, to the second BS, a message requesting changing of a transmission and reception mode.

12. A method for operating a first user equipment (UE) for measuring an interference signal in a wireless communication system, the method comprising:

receiving, from a first base station (BS), timing information for measuring an interference signal generated by an uplink signal of a second UE communicating with a second BS; and measuring the interference signal generated by the uplink signal of the second UE, based on the timing information, wherein the timing information is determined based on a transmission and reception mode of the second BS.

13. The method of claim 12, further comprising:

transmitting, to the first BS, a measurement value of the interference signal generated by the uplink signal of the second UE; and when the measurement value of the interference signal is greater than a threshold, receiving, from the first BS, a message restricting downlink scheduling of the first UE.

14. A first base station (BS) for controlling interference signal measurement of a first user equipment (UE) in a wireless communication system, the first BS comprising:

a transceiver; and a controller, wherein the controller is configured to:

receive, from a second BS, information about a transmission and reception mode of the second BS, based on the information about the transmission and reception mode of the second BS, determine timing information used when the first UE measures an interference signal generated by an uplink signal of a second UE communicating with the second BS, and control to transmit, to the first UE, the timing information to enable the first UE to measure the interference signal.

15. A first user equipment (UE) for measuring an interference signal in a wireless communication system, the first UE comprising:

a transceiver; and a controller, wherein the controller is configured to:

receive, a first base station (BS), timing information used for measuring an interference signal generated by an uplink signal of a second UE communicating with a second BS, and measure the interference signal generated by the uplink signal of the second UE, based on the timing information, and wherein the timing information is determined based on a transmission and reception mode of the second BS.

* * * * *